(12) United States Patent
Takahira et al.

(10) Patent No.: US 11,905,437 B2
(45) Date of Patent: Feb. 20, 2024

(54) WATER-BASED PAINT COMPOSITION

(71) Applicants: AISIN KAKO KABUSHIKI KAISHA, Toyota (JP); TOYOTA JIDOSHA KABUSHIKI KAISHA, Aichi-ken (JP)

(72) Inventors: Takayoshi Takahira, Toyota (JP); Toru Tanaka, Toyota (JP); Yasunari Iwata, Kakegawa (JP)

(73) Assignees: AISIN KAKO KABUSHIKI KAISHA, Toyota (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/110,482

(22) Filed: Feb. 16, 2023

(65) Prior Publication Data

US 2023/0203325 A1    Jun. 29, 2023

Related U.S. Application Data

(62) Division of application No. 16/825,257, filed on Mar. 20, 2020, now Pat. No. 11,613,660.

(30) Foreign Application Priority Data

Mar. 22, 2019  (JP) .................................. 2019-55020

(51) Int. Cl.
| | |
|---|---|
| *C09D 7/61* | (2018.01) |
| *B01J 21/10* | (2006.01) |
| *C09D 133/08* | (2006.01) |
| *C09D 123/12* | (2006.01) |
| *B01J 35/02* | (2006.01) |
| *C09D 7/47* | (2018.01) |
| *C09D 7/20* | (2018.01) |
| *B01J 23/34* | (2006.01) |
| *C08K 5/17* | (2006.01) |
| *C09D 7/45* | (2018.01) |
| *C08K 3/04* | (2006.01) |

(52) U.S. Cl.
CPC ................ *C09D 7/61* (2018.01); *B01J 21/10* (2013.01); *B01J 23/34* (2013.01); *B01J 35/023* (2013.01); *C08K 5/17* (2013.01); *C09D 7/20* (2018.01); *C09D 7/45* (2018.01); *C09D 7/47* (2018.01); *C09D 123/12* (2013.01); *C09D 133/08* (2013.01); *C08K 3/04* (2013.01)

(58) Field of Classification Search
CPC ...... C09D 7/61; C09D 133/08; C09D 123/12; C09D 7/47; C09D 7/20; C09D 7/45; B01J 21/10; B01J 35/023; B01J 23/34; C08K 5/17; C08K 3/04
USPC ......................................................... 106/401
See application file for complete search history.

(56) References Cited

FOREIGN PATENT DOCUMENTS

| | | | | |
|---|---|---|---|---|
| CN | 1993431 | A | 7/2007 | |
| CN | 106807362 | A | 6/2017 | |
| CN | 109370340 | A | 2/2019 | |
| JP | 4-89873 | A | 3/1992 | |
| JP | 9-77991 | A | 3/1997 | |
| JP | 2002-514966 | A | 5/2002 | |
| JP | 2008-000746 | A | 1/2008 | |
| JP | 2008000746 | A | * 1/2008 | ......... B01D 46/0052 |
| JP | 2010-37516 | A | 2/2010 | |
| JP | 2014-024027 | A | 2/2014 | |
| KR | 10-0672758 | B1 | 1/2007 | |

OTHER PUBLICATIONS

Office Action dated Jan. 4, 2022 in Chinese Application No. 202010201772.7.
Office Action dated Mar. 25, 2022 in Chinese Application No. 202111456014.0.
Notice of Reasons for Refusal dated Mar. 9, 2021 from the Japanese Patent Office in JP Application No. 2019-055020.
Communication dated Jan. 27, 2021 from the Intellectual Property of India in Application No. 202014012130.
Communication dated Jun. 3, 2021 from The State Intellectual Property Office of P.R. of China in Application No. 202010201772.7.

* cited by examiner

*Primary Examiner* — Hui H Chin
(74) *Attorney, Agent, or Firm* — Sughrue Mion, PLLC; Richard C. Turner

(57) ABSTRACT

A water-based paint composition has performance to decompose ozone. The water-based paint composition includes a manganese oxide-based catalyst, an activated carbon, a polyacrylate-based dispersant, a water-soluble resin, a pH adjuster, and a water-based solvent.

3 Claims, 2 Drawing Sheets

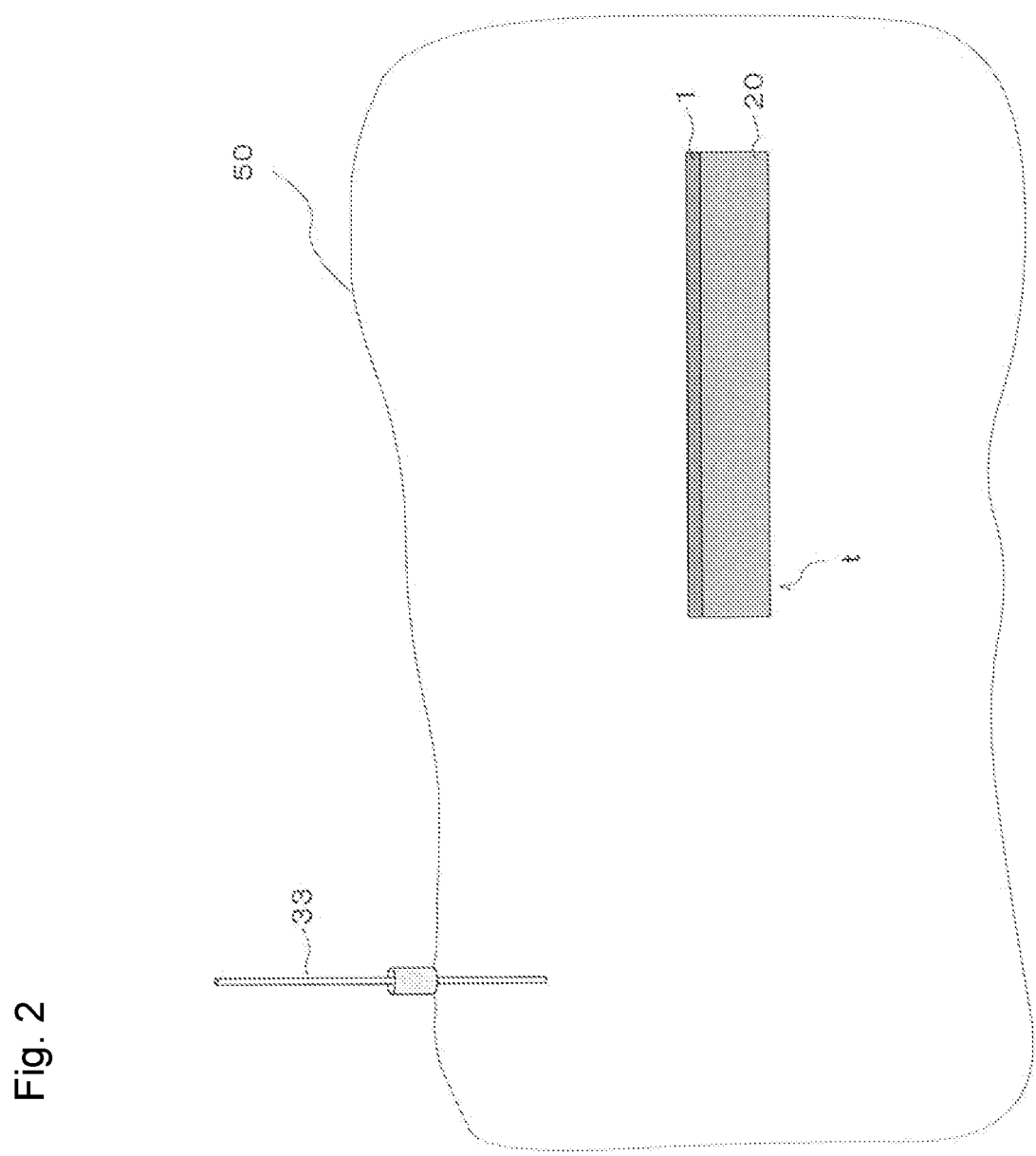

WATER-BASED PAINT COMPOSITION

INCORPORATION BY REFERENCE

This application is a divisional of U.S. patent application Ser. No. 16/825,257, filed Mar. 20, 2020, in the U.S. Patent and Trademark Office, which application claims priority from Japanese Patent Application No. 2019-55020, filed on Mar. 22, 2019, the contents of which are hereby incorporated by reference.

TECHNICAL FIELD

The present invention relates to a water-based painting composition, which is applied to, for example, car body surfaces exposed to air flow in traveling. The water-based painting composition allows ozone decomposition. In particular, the present invention relates to a water-based painting composition having good storage stability and high performance to decompose ozone.

BACKGROUND ART

Volatile organic compounds (VOC) such as nitrogen oxides (NOx) and hydrocarbons (HC), which are included in car exhaust or factory fumes, change to photochemical oxidants ($O_x$) through chemical reaction with oxygen in air or photochemical reaction with ultra violet in sunlight. Such photochemical oxidants, which are air pollutants or environmental load substances, mainly include ozone ($O_3$) and cause photochemical smog. In Japan, photochemical oxidants of 0.06 ppm and low per unit time is required as environmental standard. However, currently, the concentration of photochemical oxidants is above environmental standard. While, environmental awareness rises. It is therefore desired to reduce photochemical oxidants rapidly.

Thus, ozone decomposition has been proposed to prevent photochemical smog while the emission of volatile organic compounds including nitrogen oxides has been regulated.

In some areas, for example, California in U.S.A, an air purification system has been examined. The air purification system employs vehicles with radiators carrying an ozone destruction catalyst. cars using a direct ozone reduction (DOR) technology, specifically, cars having an air purification device, which allow ozone in air to be decomposed by ozone destruction catalyst, has been put into practical use. In California in U.S.A, the cars using a direct ozone reduction (DOR) technology and their manufacturer can receive predetermined privileges (NMOG credit certification) as they serve to reduction of exhaust of non-methane organic gases (NMOG), which causes photochemical smog.

With regard to a radiator carrying ozone destruction catalyst, Japanese Unexamined Patent Application Publication (Translation of PCT Application) No. 2002-514966 (JP-T-2002-514966) and Japanese Unexamined Patent Application Publication No. 2008-000746 (JP-A-2008-00746) disclose air purification devices that have a metal oxide catalyst carried on the surfaces of radiators or fins, which are exposed to air flow during traveling. According to these prior arts, the ozone destruction catalyst layer on the surface of the radiator allows decomposition of ozone in air.

Japanese Unexamined Patent Application Publication No. 2014-024027 (JP-A-2014-024207) also discloses an air purification device that uses not only a metal oxide catalyst but also an activated carbon for ozone decomposition.

TECHNICAL PROBLEM

Thus, the air purification devices for vehicle have been developed. These air purification devices have radiators or fins with surfaces carrying a catalyst for decomposing ozone in air and thus enables ozone in air to be decomposed.

Unfortunately, the NMOG credit is provided in accordance with performance to decompose ozone after a long period of use and requires cars with the air purification devices to check the performance to decompose ozone and have on-board diagnostics. Thus, the cars having the air purification devices are expensive. Further, the amount of the ozone decomposition catalyst carried on the surfaces of radiators or fins are limited to allow the radiators or the fins to have high heat exchange performance. This results in finite performance to decompose ozone.

In Japan inspired by other countries employing NMOG credit and air pollutant control, there is a desire to develop environmentally friendly cars. The conversion of paint from solvent-based with high-VOC to water-based with low-VOC has increased. An example of the paint includes anticorrosive paint, which is coated on the surfaces of substrate such as sheet steel of car bodies. Such a paint is applied to a wide range of the surfaces of car bodies. Thus, the paint may be of ozone decomposition performance to permit the car with the paint to be more environmentally friendly.

It is an object of the present invention to provide a water-based paint composition having performance to decompose ozone.

SOLUTION TO PROBLEM

A water-based paint composition according to a first aspect of the present invention includes a manganese oxide-based catalyst, an activated carbon, a polyacrylate-based dispersant, a water-soluble resin, a pH adjuster, and a water-based solvent.

The manganese oxide-based catalyst is required to have catalytic decomposition of ozone. As the manganese oxide-based catalyst, metal oxides such as manganese oxides and manganese dioxides are employed. Manganese dioxides are especially preferred.

As the activated carbon, for example, a coconut shell activated carbon, a petroleum pitch-based activated carbon, or a wood-based activated carbon, may be employed to provide a high specific surface area for ozone adsorption. Among these, an activated carbon from coconut shell is especially preferred. The activated carbon preferably has a median diameter in a range of 1 to 20 μm and a specific surface area in a range of 500 to 3000 $m^2/g$ determined by the Brunauer-Emmett-Teller (BET) method. The median diameter may be comparable to an average particle size. The activated carbon with very small particles tends to agglomerate or flocculate readily and thus may be less likely to be dispersed. The activated carbon with very large particles has a low surface area and thus may fail to provide intended performance to decompose ozone. The activated carbon with very large particles may also fail to provide the paint film having intended film-forming and adhesion. The activated carbon with a very high surface area tends to agglomerate or flocculate readily and thus may be less likely to be dispersed. The activated carbon with a very low surface area may fail to provide intended performance to decompose ozone and fail to provide the paint film having intended film-forming and adhesion. The particulate activated carbon having a median particle diameter in a range of 1 to 20 μm and a specific surface area in a range of 500 to 3000 $m^2/g$ determined by the BET method is excellent in dispersion and dispersion stability, and has high performance to decompose ozone. The most preferred median particle diameter is in a range of 3 to 18 μm, especially, in a range of 5 to 15 μm. The most preferred specific surface area by the BET method is in a range of 600 to 2500 m$^2$/g, especially, in a range of 900 to 2000 m$^2$/g.

The "specific surface area" is determined by the Brunauer-Emmett-Teller (BET) method. According to BET method, the volume of gas such as nitrogen adsorbed to the surface of the target particles is measured at the boiling point of liquid-nitrogen. The specific surface area is determined by physical adsorption of the gas on the surface of the target particles and by calculating the amount of adsorbate gas corresponding to a monomolecular layer on the surface.

The "median diameter" is a particle size (diameter) at a point where 50% (by weight or number) of the particles resides above this point and 50% (by weight or number) of the particles resides below this point in particle size distributions, according to "Test Powders and Test Particles" designated by Japanese Industrial Standards (JIS) Z 8901.

The "median diameter" is also called 50% particle size, 50% diameter, or D50. Average particle diameter may be often used as representation of a particle size, as well as a median diameter. Herein, the median diameter is measured by laser diffraction/scattering analysis. Alternatively, the value of the median diameter may be disclosed in product description. The "median diameter measured by laser diffraction/scattering analysis" is a particle diameter (D50) that is the midpoints or 50% position of the cumulative % distribution determined by laser diffraction/scattering analysis with a laser diffraction particle size analyzer.

With respect to the value of the particle diameter, approximate value or any error in measurement is acceptable. Errors of 10% or less is within an allowable range. When the particle size distribution is often symmetrical about the center (50% diameter), the median diameter is the same as the average particle diameter. From this point of view, the median diameter can be loosely equated with the average particle diameter. The difference between the median diameter and the average particle diameter may be considered to be within an error range.

The water-soluble resin may be also called a water-dispersible resin.

The pH adjuster is used to adjust the hydrogen-ion export (pH) to, preferably, in a range of 7 to 12, more preferably, 9.5 to 11. The pH adjuster may be also called a neutralizer.

In the water-based paint composition according to the first aspect of the present invention, the manganese oxide-based catalyst is preferably a manganese dioxide-based catalyst.

The manganese dioxide-based catalyst preferably has a median diameter in a range of 1 to 20 μm and a specific surface area in a range of 100 to 400 m$^2$/g determined by the BET method. The median diameter may be comparable to an average particle size. The catalyst with very small particles tends to agglomerate or flocculate readily and thus may be less likely to be dispersed. The catalyst with very large particles has a very low surface area and thus may fail to provide intended performance to decompose ozone. Additionally, the catalyst with very large particles may fail to provide the paint film having intended film-forming and adhesion. The catalyst with a very large surface area tends to agglomerate or flocculate readily and thus may be less likely to be dispersed. The catalyst with a very low surface area may fail to provide intended performance to decompose ozone and fail to provide the paint film having intended film-forming and adhesion. The particulate catalyst having a median diameter in a range of 1 to 20 μm and a specific surface area in a range of 100 to 400 m$^2$/g determined by the BET method is excellent in dispersion and dispersion stability, and has high performance to decompose ozone. The most median diameter is in a range of 3 to 18 μm, especially, in a range of 5 to 15 μm. The most preferred specific surface area determined by the BET method is in a range of 150 to 350 m$^2$/g, especially, in a range of 180 to 300 m$^2$/g.

In the water-based paint composition according to the first aspect of the present invention, the weight ratio of the manganese oxide-based catalyst to the activated carbon (solid content) is preferably in the range of 20:80 to 80:20, more preferably, 30:70 to 70:30.

The weight ratio means solid weight ratio. The manganese oxide-based catalyst and the activated carbon are mixed at the weight ratio in a range of, preferably, 20:80 to 80:20, more preferably, 30:70 to 70:30 to provide the paint film having the weight ratio of the manganese oxide-based catalyst to the activated carbon in a range of, preferably, 20:80 to 80:20, more preferably, 30:70 to 70:30.

In the water-based paint composition according to the first aspect of the present invention, the total amount of the manganese oxide-based catalyst and the activated carbon in the paint film from the water-based paint composition is preferably in a range of 60 to 90%, more preferably, 65 to 85%, most preferably, 70 to 80% by mass.

In the water-based paint composition according to the first aspect of the present invention, the polyacrylate-based dispersant preferably has a weight average molecular in a range of 5000 to 30000, more preferably, 6000 to 28000, particularly, 7000 to 25000, acid value in a range of 1 to 50, more preferably, 3 to 48, most preferably, 5 to 45, and hydrogen-ion exponent (pH) in a range of 4 to 9, more preferably, 4.5 to 8.5, most preferably, 5 to 8. The weight average molecular is determined by gel permeation chromatography (GPC) relative to polystyrene standard.

In the water-based paint composition according to the first aspect of the present invention, the polyacrylate-based dispersant is preferably present at 1.5 to 75, more preferably, 2 to 60, particularly, 2.5 to 50 parts by mass, per hundred parts by weight of the total solid amount of the manganese oxide-based catalyst and the activated carbon.

In the water-based paint composition according to the first aspect of the present invention, the manganese oxide-based catalyst and the activated carbon preferably have a maximum particle diameter ($D_{max}$) of 20 μm or less. The maximum particle diameter, which is indicative of particle dispersion, is determined by a line transect method with a grind gauge according to JIS K 5600 and JIS K 5400 (1990).

In the water-based paint composition according to the first aspect of the present invention, the manganese oxide-based catalyst and the activated carbon preferably have a 90% diameter (D90) of 10 μm or less. The 90% diameter (cumulative %) is based on a volume distribution and is determined by laser diffraction analysis with a laser diffraction particle size analyzer.

In the water-based paint composition according to the first aspect of the present invention, the water-soluble resin is preferably an acrylic resin or a polypropylene resin.

A process for preparing a water-based paint composition according to a second aspect of the present invention includes a dispersion step of mixing and dispersing a water-based solvent, a manganese oxide-based catalyst, an activated carbon, and a polyacrylate-based dispersant, a neutralization step of mixing a pH adjuster with the resultant mixture, and a paint prepare final step of mixing a water-soluble resin with the resultant mixture.

In the process for preparing the water-based paint composition according to the second aspect of the present invention, the manganese oxide-based catalyst and the activated carbon are dispersed using a bead mill or a roll mill and have a maximum particle diameter of 20 μm or less through the dispersion step.

The maximum particle diameter, which is indicative of particle dispersion, is determined by a line transect method with a grind gauge according to JIS K 5600 and JIS K 5400 (1990).

In the process for preparing the water-based paint composition according to the second aspect of the present invention, the manganese oxide-based catalyst and the activated carbon preferably are dispersed using a bead mill or a roll mill and have a 90% diameter (D90) of 10 μm or less through the dispersion step.

The 90% diameter (cumulative %) is based on a volume distribution and is determined by laser diffraction analysis with a laser diffraction particle size analyzer.

With respect to the above values, approximate value or any error in used materials, application use, calculation, or measurement is acceptable.

ADVANTAGEOUS EFFECTS OF INVENTION

In a first aspect of the present invention, a water-based paint composition includes a manganese-oxide based catalyst, an activated carbon, a polyacrylate-based dispersant, a water-soluble resin, a pH adjuster, and a water-based solvent. The water-based paint composition is applied to a substrate and then dried. This yields a hardened paint film.

With the water-based paint composition according to the first aspect of the present invention, the polyacrylate-based dispersant allows the manganese oxide-based catalyst and the activated carbon to be dispersed finely and stably. Thus, the water-based paint composition is excellent in storage stability. Additionally, the water-based paint composition creates the paint film having good film-forming and good adhesion. The water-based paint composition is less likely to create the hardened paint film having paint seeding. Further, the fine dispersed catalyst and the fine dispersed activated carbon adsorb a large amount of ozone. Thus, the paint film from the water-based paint composition has high performance to decompose ozone. In particular, the combination use of the manganese oxide-based catalyst and the activated carbon provides higher performance to decompose ozone than if only one or the other is used.

In the water-based paint composition according to the first aspect of the present invention, the manganese oxide-based catalyst is preferably a manganese dioxide-based catalyst. This manganese dioxide-based catalyst has higher catalytic activity and provides higher performance to decompose ozone.

In the water-based paint composition according to the first aspect of the present invention, the solid weight ratio of the manganese oxide-based catalyst to the activated carbon is preferably in a range of 20/80 to 80/20, more preferably, 30/70 to 70/30. Such a ratio allows the manganese oxide-based catalyst and the activated carbon to act synergistically, thus providing higher performance to decompose ozone, as well as good storage stability.

In the water-based paint composition according to the first aspect of the present invention, the manganese oxide-based catalyst and the activated carbon is preferably is present in the paint film from the water-based paint composition at total concentration in a range of 60 to 90%, more preferably, 65 to 85%, most preferably, 70 to 80% by mass. This provides higher performance to decompose ozone, as well as high adhesion to substrates.

In the water-based paint composition according to the first aspect of the present invention, the polyacrylate-based dispersant preferably has a weight average molecular in a range of 5000 to 30000, an acid value in a range of 1 to 50, and a hydrogen-ion exponent in a range of pH4 to pH9. This water-based paint composition has the paint contents with higher dispersion and dispersion stability, as well as performance to decompose ozone.

In the water-based paint composition according to the first aspect of the present invention, the polyacrylate-based dispersant is preferably present at 1.5 to 75, more preferably, 2 to 60, particularly, 2.5 to 50 parts by mass, per hundred parts by weight of the total solid amount of the manganese oxide-based catalyst and the activated carbon. This water-based paint composition has both high storage stability and high performance to decompose ozone.

In the water-based paint composition according to the first aspect of the present invention, the manganese oxide-based catalyst and the activated carbon have a maximum particle diameter ($D_{max}$) of 20 μm or less. The maximum particle diameter, which is indicative of particle dispersion, is determined by a line transect method with a grind gauge according to JIS K 5600 and JIS K 5400 (1990).

The inventors have found that the use of the polyacrylate-based dispersant allows the manganese oxide-based catalyst and the activated carbon to be finely dispersed and have a maximum particle diameter of 20 μm or less, which is determined by a line transect method with a grind gauge according to JIS K 5600 and JIS K 5400 (1990). The water-based paint composition including the manganese oxide-based catalyst and the activated carbon that have a maximum particle diameter of 20 μm or less, which is determined by a line transect method with a grind gauge according to JIS K 5600 and JIS K 5400 (1990), has less agglomeration or flocculation of the paint contents including the activated carbon and the catalyst. Thus, this water-based paint composition provides the paint film having higher forming-film and adhesion. Additionally, the manganese oxide-based catalyst and the activated carbon that have a maximum particle diameter of 20 μm or less adsorb a larger amount of ozone, thus providing higher performance to decompose ozone. Further, this water-based paint composition is excellent in dispersion stability and storage stability. Thus, this water-based paint composition has long shelf life and provides the paint film with stable paint performance.

In the water-based paint composition according to the first aspect of the present invention, the manganese oxide-based catalyst and the activated carbon have a 90% diameter (D90) of 10 μm or less. The 90% diameter (cumulative %) is based on a volume distribution and is determined by laser diffraction analysis.

The inventors have found that the use of the polyacrylate-based dispersant allows the manganese oxide-based catalyst and the activated carbon to be finely dispersed and have a 90% diameter (D90) of 10 μm or less, which is determined by laser diffraction analysis. The water-based paint composition including the manganese oxide-based catalyst and the activated carbon that have a 90% diameters (D90) of 10 μm or less has a small amount of coarser grains such as agglomeration and flocculation. Thus, this water-based paint composition provides the paint film having less paint seeding and evenness. This paint film is excellent in forming-film and adhesion. Additionally, the paint film having less agglomeration and flocculation adsorbs a large amount of ozone and have high performance to decompose ozone. Further, this water-based paint composition is excellent in dispersion stability and storage stability.

Thus, this water-based paint composition has higher storage stability, and the paint film from the paint composition is excellent in visual appearance and has higher performance to decompose ozone.

In the water-based paint composition according to the first aspect of the present invention, the water-based resin is preferably an acrylic resin or a polypropylene resin. The acrylic resin and the polypropylene resin are compatible with the manganese oxide-based catalyst and the activated carbon. Thus, the manganese oxide-based catalyst and the activated carbon is more uniformly dispersed in the resin. Consequently, this water-based paint composition has the paint contents with higher dispersion and dispersion stability. In particular, the acrylic resin has a wide variety of a molecular weight. Thus, the use of the acrylic resin may easily yield the paint film having desired performance. Additionally, the acrylic resin provides the paint film having high weather resistance, water resistance, and chemical resistance. The polypropylene resin provides the paint film having good adhesion to resin substrates in addition to metal substrates. Such a paint film has long-term high performance to decompose ozone.

In a second aspect of the present invention, a process for preparing a water-based paint composition includes the successive steps of: mixing a water-based solvent, a manganese oxide-based catalyst, an activated carbon, and a polyacrylate-based dispersant; mixing a pH adjuster with the resultant mixture for neutralization; and mixing a water-soluble resin with the resultant mixture.

With the process for preparing the water-based paint composition according to the second aspect of the present invention, the polyacrylate-based dispersant allows the manganese oxide-based catalyst and the activated carbon to be dispersed finely and stably. Thus, the water-based paint composition is excellent in storage stability. This water-based paint composition is applied to a substrate and then dried. This yields a hardened paint film with paint seeding free. Such a paint film has good film-forming and good adhesion. The fine dispersed catalyst and the fine dispersed activated carbon in the paint film adsorb a large amount of ozone. Thus, the paint film has high performance to decompose ozone. In particular, the combination use of the manganese oxide-based catalyst and the activated carbon provides higher performance to decompose ozone than if only one or the other is used.

In the process for preparing the water-based paint composition according to the second aspect of the present invention, the manganese oxide-based catalyst and the activated carbon are dispersed using a bead mill or a roll mill, and have a maximum particle diameter of 20 μm or less through a dispersion step.

The inventors have found that the use of the polyacrylate-based dispersant allows the manganese oxide-based catalyst and the activated carbon to be finely dispersed and have a maximum particle diameter of 20 μm or less, which is determined by a line transect method with a grind gauge. The water-based paint composition including the manganese oxide-based catalyst and the activated carbon that have a maximum particle diameter of 20 μm or less, which is determined by a line transect method with a grind gauge, has less agglomeration or flocculation of the paint contents including the activated carbon and the catalyst. Thus, this water-based paint composition provides the paint film having higher forming-film and adhesion. Additionally, the manganese oxide-based catalyst and the activated carbon that have a maximum particle diameter of 20 μm or less adsorb a larger amount of ozone, thus providing higher performance to decompose ozone. Further, this water-based paint composition is excellent in dispersion stability and storage stability.

Thus, the water-based paint composition has long shelf life and the paint film from the water-based paint composition has stable paint performance.

In the process for preparing the water-based paint composition according to the second aspect of the present invention, the manganese oxide-based catalyst and the activated carbon are dispersed using a bead mill or a roll mill, and have 90% diameters (D90) of 10 μm or less through a dispersion step. The 90% diameter (cumulative %) is based on a volume distribution and is determined by laser diffraction analysis.

The inventors have found that the use of the polyacrylate-based dispersant allows the manganese oxide-based catalyst and the activated carbon to be finely dispersed and a 90% diameter ($D_{90}$) of 10 μm or less, which is determined by laser diffraction analysis. The water-based paint composition including the manganese oxide-based catalyst and the activated carbon that have a 90% diameters ($D_{90}$) of 10 μm or less has a small amount of coarser grains such as agglomeration and flocculation. Thus, this water-based paint composition provides the paint film having less paint seeding and evenness. Such a paint film is excellent in forming-film and adhesion. Additionally, the paint film having less agglomeration and flocculation adsorbs a large amount of ozone and have high performance to decompose ozone. Further, this water-based paint composition is excellent in dispersion stability and storage stability.

Thus, the water-based paint composition has higher storage stability and the paint film from the composition is excellent in visual appearance and higher performance to decompose ozone.

BRIEF DESCRIPTION OF DRAWINGS

FIG. 2 is a schematic view illustrating the ozone decomposition test for examples of TABLE 3.

DESCRIPTION OF EMBODIMENTS

Figure 1:
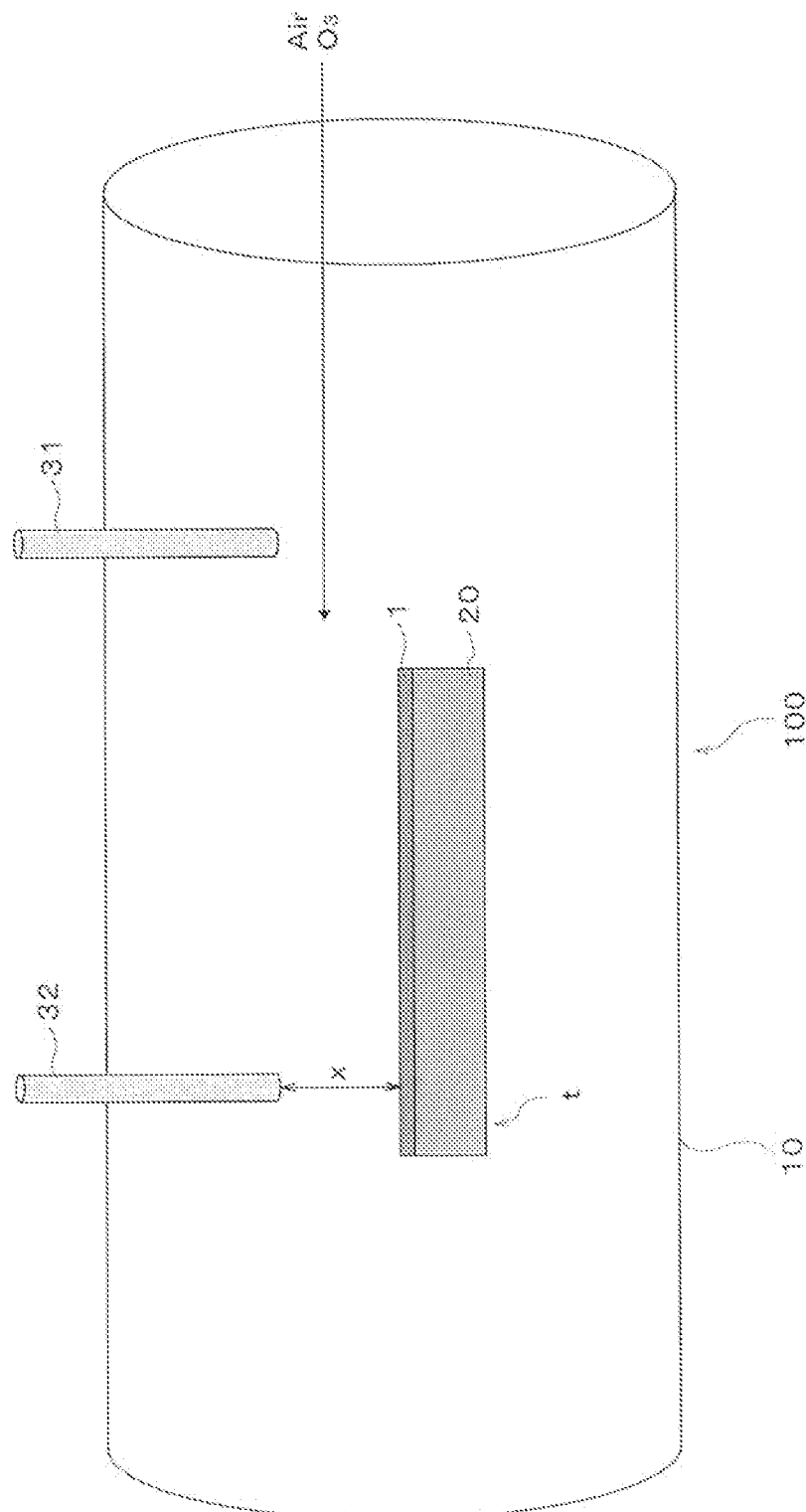
FIG. 1 is a schematic view illustrating the ozone decomposition test for examples of TABLE 1, TABLE 2, and TABLE 4.

Embodiments of the present invention are described hereafter. In the embodiments of the present invention, the same marks and the same codes mean the same or equivalent function parts. Thus, overlapped description thereof will be omitted here.

A process for preparing a water-based paint composition according to an embodiment of the present invention will first be described.

The water-based paint composition according to the embodiment of the present invention includes a manganese oxide-based catalyst, an activated carbon, a polyacrylate-based dispersant, a water-soluble resin, a pH adjuster, and water as a solvent.

To prepare the water-based paint composition according to the embodiment of the present invention, a dispersing step is first performed. In this dispersing step, water as a solvent, a manganese oxide-based catalyst, an activated carbon, and a polyacrylate-based dispersant are mixed and the resultant mixture is dispersed using a disperser.

As the manganese oxide-based catalyst ($Mn_xO_y$-based catalyst), a manganese oxide such as a manganese monoxide-based catalyst (MnO-based catalyst), a manganese dioxide-based catalyst or a manganese (IV) oxide-based catalyst, a spinel metal manganese oxide, or the like may be employed. Among these, a manganese dioxide-based catalyst ($MnO_2$-based catalyst), which has high catalytic activity, is especially preferred. Manganese dioxide is substantially non-stoichiometric compound with the formula $MnO_x$ (X=1.93-2).

The manganese dioxide may be natural or synthetic, specifically produced using electrolysis technique or chemical synthesis technique. The manganese dioxide may have an amorphous structure or crystal structure such as α-type, β-type, γ-type, or δ-type structure. Among these structures, a α-manganese dioxide with a cryptomelane structure is especially preferred. Alternatively, the manganese dioxide may have an amorphous structure.

The manganese dioxide-based catalyst, which includes a manganese dioxide ($MnO_2$) as a main component, may include NiO, CuO, or AgO as a co-catalyst. The manganese dioxide content is preferably 70% or more, most preferably, 80% or more in the manganese dioxide-based catalyst.

The manganese oxide-based catalyst such as a manganese dioxide-based catalyst preferably has a specific surface area in a range of 100 to 400 $m^2/g$, which is determined by the Brunauer-Emmett-Teller (BET) method or the nitrogen adsorption method. The particulate catalyst having too high a specific surface area may agglomate or flocculate easily, and be less likely to be dispersed. Poor dispersion of the particulate catalyst may cause a paint nozzle to be clogged with the catalyst particles, or provide the paint film having paint seeding or agglomerate. The paint film with paint seeding or agglomerate may have poor film-forming or adhesion. Such a paint film may peel easily or the catalyst particles may drop from the paint film easily. Further, poor dispersion stability of the particulate catalyst may fail to provide intended storage stability of the paint composition. The particulate catalyst having too low a specific surface area may fail to provide intended performance to decompose ozone. The catalyst particles having a specific surface area in a range of 100 to 400 $m^2/g$, which is determined by the BET method, is well dispersed and excellent in dispersion stability. Additionally, such a particulate catalyst provides the paint film having excellent film-forming and adhesion. Such a paint film is less likely to drop the catalyst particles and achieves high performance to decompose ozone for a long term. Further, the particulate catalyst having a specific surface area in a range of 100 to 400 $m^2/g$ provides the paint composition with higher storage stability of. A most preferred specific surface area determined by the BET method is in a range of 150 to 350 $m^2/g$, especially, 180 to 300 $m^2/g$.

The manganese oxide-based catalyst such as a manganese dioxide-based catalyst preferably has a median diameter in a range of 1 to 20 μm. The median diameter may be comparable to an average particle size. The particulate catalyst having too large a particle size has a low surface area and thus may fail to achieve intended performance to decompose ozone. The particulate catalyst having too large a particle size may provide the paint film having poor film-forming or adhesion. Such a paint film may peel easily or the catalyst may drop from the paint film easily. The particulate catalyst having too small a particle size may agglomerate or flocculate easily and be less likely to be dispersed. Poor dispersion of the particulate catalyst may provide the paint film having paint seeding or agglomerate. The paint film with paint seeding or agglomerate may have poor film-forming or adhesion. Such a paint film may peel easily or the catalyst particles may drop from the paint film easily. Further, poor dispersion stability of the particulate catalyst may fail to provide intended storage stability of the paint composition. The particulate catalyst having a median diameter in a range of 1 to 20 μm is well dispersed and excellent in dispersion stability. Additionally, such a catalyst provides the paint film having excellent film-forming and adhesion. Such a paint film is less likely to drop the catalyst and achieves high performance to decompose ozone for a long term. Further, the particular catalyst having a median diameter in a range of 1 to 20 μm provides the paint composition with higher storage stability. A most preferred median diameter is in a range of 3 to 18 μm, especially, 5 to 15 μm.

The manganese oxide-based catalyst enables ozone to be decomposed into harmless substance(s). Specifically, the catalyst adsorbs ozone and decreases self-decomposition reaction activation energy of the ozone. This results in ozone decomposition. The resulting decomposition product are desorbed from the catalyst. Thus, the ozone is decomposed into oxygen through the catalysis of the manganese oxide-based catalyst.

Examples of the activated carbon include sawdust, wood chip, charcoal, bamboo charcoal, coal (including lignite, brown coal, and bituminous coal), petroleum such as petroleum pitch or oil carbon, walnut shell charcoal, coconut shell charcoal, resin (including phenolic resin and epoxy resin), and rayon. Among these, preferred are coconut shell charcoal from coconut palm, oil palm, sago palm, which are high in carbon content. The activated carbon preferably has a carbon content of 90% or more.

The activated carbon such as a coconut shell charcoal preferably has a specific surface area in a range of 500 to 3000 $m^2/g$, which is determined by the BET method using nitrogen adsorbate. The activated carbon having too high a specific surface area may agglomerate or flocculate easily and be less likely to be dispersed. Poor dispersion of the activated carbon may cause a paint nozzle to be clogged with the activated carbon particles, or provide the paint film having paint seeding or agglomerate. The paint film with paint seeding or agglomerate may have poor film-forming or adhesion. Such a paint film may peel easily or the activated carbon particles may drop from the paint film easily. Further, poor dispersion stability of the particulate activated carbon may fail to provide intended storage stability of the paint composition. The activated carbon having too low a specific surface area may fail to provide intended performance to decompose ozone. The activated carbon having a specific surface area in a range of 500 to 3000 $m^2/g$, which is determined by the BET method, is well dispersed and excellent in dispersion stability. Additionally, such a particulate activated carbon provides the paint film having excellent film-forming and adhesion. Such a paint film is less likely to drop the activated carbon particles and achieves high performance to decompose ozone for a long term. Further, the particular activated carbon having a specific surface area in a range of 500 to 3000 $m^2/g$ provides the paint composition with higher storage stability. A most preferred specific surface area determined by the BET method is in a range of 600 to 2500 $m^2/g$, especially, in a range of 900 to 2000 $m^2/g$. The activated carbon has a total pore volume, for example, in a range of 0.1 to 1.5 $cm^3/g$, preferably, 0.2 to 1.0 $cm^3/g$. This total pore volume is determined in accordance with nitrogen adsorption amount at relative pressure $P/P_0$ of 1.0 in nitrogen adsorption isotherm. The activated carbon has an average pore diameter (which is calculated using the formula: total pore volume/ BET specific surface area×4), for example, in a range of 0.3 to 10 nm, preferably, 0.5 to 5 nm, for preventing particulate matters in air from being bound to the activated carbon and providing higher performance to adsorb ozone.

The activated carbon such as a coconut shell charcoal preferably has a median diameter in a range of 1 to 20 µm. The median diameter may be comparable to an average particle size. The particulate activated carbon having too large a particle size has a low surface area and thus may fail to achieve high performance to decompose ozone. The particulate activated carbon having too large a particle size may provide the paint film having poor film-forming or adhesion. Such a paint film may peel easily or the activated carbon may drop from the paint film easily. The particulate activated carbon having too small a particle size may agglomerate or flocculate easily and be less likely to be dispersed. Poor dispersion of the particulate activated carbon may provide the paint film having paint seeding or agglomerate. The paint film with paint seeding or agglomerate may have poor film-forming or adhesion. Such a paint film may peel easily or the activated carbon particles may drop from the paint film easily. Further, poor dispersion stability of the particulate activated carbon may fail to provide intended storage stability of the paint composition. The activated carbon particles having a median diameter in a range of 1 to 20 µm is well dispersed and excellent in dispersion stability. Additionally, such a particulate activated carbon provides the paint film having excellent film-forming and adhesion. Such a paint film is less likely to drop the activated carbon particles and achieves high performance to decompose ozone for a long term. A most preferred specific surface area is in a range of 3 to 18 µm, especially, in a range of 5 to 15 µm.

The activated carbon has pores in which ozone is adsorbed. The ozone adsorbed on the activated carbon reacts with the activated carbon or receives electrons from the activated carbon; that is, the activated carbon adsorbs ozone and decreases self-decomposition reaction activation energy of the ozone. This causes the ozone to be decomposed into carbon monoxide, carbon dioxide, reactive oxygen species, or oxygen. Thus, the ozone is decomposed into harmless substance(s). The activated carbon exhibits higher activity in a wide range of temperatures including room temperature (15° C. to 25° C.) and in a wide range of humidity, while the manganese oxide-based catalyst exhibits higher activity at high temperatures, for example, about 80° C.

Thus, the water-based paint composition of the present embodiment includes a manganese oxide-based catalyst such as a manganese dioxide-based catalyst and an activated carbon such as a coconut shell charcoal. This yields the paint film having high performance to decompose ozone. In particular, the water-based paint composition of the present embodiment includes both a manganese oxide-based catalyst and an activated carbon. Such a water-based paint composition has higher performance to decompose ozone compared to a composition including one of a manganese oxide-based catalyst or an activated carbon. This may be because the heat of reaction between the activated carbon and the ozone may increase the catalytic activity of the manganese oxide-based catalyst. Alternatively or additionally, the reason may be that combination use of the manganese oxide-based catalyst and the activated carbon may allow ozone decomposition over a wider range of temperatures. Alternatively, the reason may be that the manganese oxide-based catalyst particles may be held in the pores of the activated carbon particles and this may increase the frequency of contact with the ozone. Further, the reason may be that the manganese oxide-based catalyst may prevent oxidation or degradation of the activated carbon, which is exposed to reactive oxygen species. For such reasons, the water-based paint composition including both a manganese oxide-based catalyst and an activated carbon has higher performance to decompose ozone compared to a composition including one of a manganese oxide-based catalyst or an activated carbon.

The water-based paint composition is required to have long term storage or storage stability for practical use. Here, the use of only the activated carbon for decomposing ozone fails to provide intended storage stability. This is because the activated carbon, which has adsorption properties, adsorbs organic matters such as resin in the paint composition and thus results in agglomeration or flocculation. Thus, the water-based paint composition of the present embodiment includes both the activated carbon and the manganese oxide-based catalyst for decomposing ozone. This combination enables the paint composition to have both high performance to decompose ozone and high storage stability. Additionally, the combination enables the paint composition to have a longer shelf life than if a paint composition uses only the activated carbon.

A paint composition uses only the manganese oxide-based catalyst might be expensive. Whereas, the paint composition using both the manganese oxide-based catalyst and the activated carbon, which is available at low cost, is inexpensive.

The manganese oxide-based catalyst (hereinafter, referred to as "catalyst") and the activated carbon, which have performance to decompose ozone, are provided in powder or particulate form. To prepare the paint having intended liquidity suitable for application, the powdery or particulate catalyst and the powdery or particulate activated carbon are required to be uniformly dispersed in the paint including a resin and a solvent. Whereas, the catalyst and the activated carbon, which have a high specific surface area for adsorbing a large amount of ozone, is easily agglomerate or flocculate. In particular, the activated carbon is more easily agglomerate or flocculate because the paint contents including organic matters such as a resin or a catalyst are held in the pores of the particulate activated carbon. A large amount of the agglomerate or flocculate of the catalyst and the activated carbon, which are poorly dispersed, may cause gelation and viscosity increase of the paint composition. Additionally, the agglomerate or flocculate may clog an applicator including a pipe and a pump. Thus, with a large amount of the agglomerate or flocculate of the catalyst and the activated carbon, the paint composition may fail to provide intended liquidity suitable for application. Further, the paint film from such a paint composition may have paint seeding and roughness. Thus, the paint film may be required to be thick to hind a target surface adequately. Such a paint film shows poor film-forming, adhesion, and appearance. Furthermore, a large amount of the agglomerate or flocculate may fail provide intended performance to adsorb and decompose ozone. In addition, the gelation and viscosity increase caused by a large amount of the agglomeration or flocculation, which are poorly dispersed, provides poor storage stability of the paint composition. Such a paint composition is short shelf life. Thus, to prepare the paint having intended liquidity suitable for application, the powdery or particulate catalyst and the powdery or particulate activated carbon are required to be prevented from agglomerating or flocculating and to be well dispersed.

The inventors have found that polyacrylate-based dispersant prevents the agglomeration or flocculation of the catalyst and the activated carbon. That is, the inventors have found that the polyacrylate-based dispersant enables the particulate catalyst and the particulate activated carbon to be finely and stably dispersed in the paint.

The present embodiment includes a dispersion step. In the dispersion step, the catalyst, the activated carbon, water such as the deionized water as a solvent, and the polyacrylate-based dispersant, which enables the catalyst and the activated carbon to be well dispersed, are mixed and stirred to disperse the contents using a mixing and dispersion machine.

This prevents the agglomeration or flocculation of the catalyst and the activated carbon and enables the catalyst and the activated carbon to be well and stably dispersed. That is, the catalyst and the activated carbon are finely dispersed. This yields the particulate catalyst having a maximum particle diameter ($D_{max}$) of, for example, 20 μm or less and the particulate activated carbon having a maximum particle diameter of, for example, 20 μm or less. The maximum particle diameter is determined by a line transect method with a grind gauge on the basis of JISK 5600 and JISK 5400 (1990). Additionally, the catalyst and the activated carbon have 90% (by weight or number) particle size (D90) of, for example, 10 μm or less. The cumulative 90% particle size (D90 or 90% diameter), is determined by laser diffraction analysis with a laser diffraction particle size analyzer. Such a water-based paint composition, in which the catalyst and the activated carbon are finely dispersed, is less likely to creates paint seeding and roughness in the paint film. Thus, this paint film is excellent in film-forming and adhesion to a target substrate. Additionally, the catalyst and the activated carbon that are finely dispersed adsorb a large amount of ozone. Thus, the paint film has high performance to decompose ozone. Furthermore, this paint film has a flat surface and good appearance. Moreover, the polyacrylate-based dispersant prevents the agglomeration or flocculation of the catalyst and the activated carbon, and enables the catalyst and the activated carbon to be well and stably dispersed. Thus, the water-based paint composition exhibits good storage stability and long shelf life.

Examples of the polyacrylate-based dispersant, which enables the catalyst and the activated carbon to be well dispersed, includes a polyacrylate salt and a compound with an acrylic group or a modified acrylic group. The polyacrylate-based dispersant may be a modified acrylic polyacrylate-based dispersant.

The polyacrylate-based dispersant preferably has a weight-average molecular weight in a range of 5000 to 30000. The polyacrylate-based dispersant having a high molecular weight has many affinity binding sites in the molecular. Thus, such a polyacrylate-based dispersant adsorbs a large amount of the particulate catalyst and the particulate activated carbon and thus prevents agglomeration or flocculation of the catalyst and the activated carbon even when the polyacrylate-based dispersant is present at a low concentration. However, the polyacrylate-based dispersant having too high a molecular weight has poor compatibility with or affinity for the paint contents. Thus, such a polyacrylate-based dispersant may fail to provide intended paint performance. The polyacrylate-based dispersant having too low a molecular weight has a few affinity binding sites and may fail to provide intended performance to disperse the catalyst and the activated carbon. The high content of the polyacrylate-based dispersant can provide high performance to disperse the catalyst and the activated carbon. However, the high content of the polyacrylate-based dispersant may fail to provide intended performance to decompose ozone because the high content of the polyacrylate-based dispersant may cause ozone to fail to adsorb onto the catalyst and the activated carbon. The polyacrylate-based dispersant having a weight-average molecular weight in a range of 5000 to 30000 has compatibility with or high affinity for the paint contents and allows the catalyst and the activated carbon to be highly dispersed. A preferred weight-average molecular weight of the polyacrylate-based dispersant is in a range of 6000 to 28000, more preferably, 7000 to 25000.

The polyacrylate-based dispersant preferably has an acid value in a range of 1 to 50. The polyacrylate-based dispersant having too high an acid value may fail to provide an intended adsorption property depending on the polarity of the paint content such as an additive including a pigment. The polyacrylate-based dispersant preferably has a hydrogen-ion exponent in a range of pH4 to pH9. The hydrogen-ion exponent of the polyacrylate-based dispersant less or more than these values may provide poor dispersion of the paint contents, depending on an additive such as a pigment. The polyacrylate-based dispersant having a hydrogen-ion exponent in a range of pH4 to pH9 provides intended dispersion stably regardless of the paint contents. A preferred acid value is in a range of 3 to 48, more preferably, 5 to 45. A preferred hydrogen-ion exponent is in a range of pH4.5 to pH8.5, more preferably, pH5 to pH8.

As the polyacrylate-based dispersant, commercial items, for example, DESPERBYK from BYK-Chemie, EFKA from Ciba Specialty Chemicals or EFKA ADDITIVES B.V., DISPARLON of Kusumoto Chemicals, Ltd., or SN-thickener from SANNOPKO may be employed.

Thus, the polyacrylate-based dispersant allows the catalyst and the activated carbon to be stably dispersed. This may be because the polyacrylate-based dispersant may attract the catalyst and the activated carbon through electric repulsion. This dispersant attraction may prevent the agglomeration or flocculation of the catalyst and enables the activated carbon and the catalyst to have a fine particle size. Alternatively or additionally, steric effects of anchor or polymer chain of the polyacrylate-based dispersant may prevent the agglomeration or flocculation of the catalyst and the activated carbon and enables the activated carbon and the catalyst to have a fine particle size. In particular, the polyacrylate-based dispersant has a high molecular weight and has many affinity binding sites. Thus, even a small amount of the polyacrylate-based dispersant achieves intended performance to bind the catalyst and the activated carbon and enables the catalyst and the activated carbon to be well dispersed. A large amount of the polyacrylate-based dispersant is not required to disperse the catalyst and the activated carbon well. Thus, the polyacrylate-based dispersant is unlikely to inhibit ozone binding to the catalyst and the activated carbon.

As the mixing and dispersion machine used in the dispersion step, for example, a ball mill, bead mill, high pressure injector, dissolver, banbury mixer, planetary mixer, butterfly mixer, spiral mixer, roll mill, sand mill, paint shaker, glen mill, high speed impeller mill, open kneader, vacuum kneader, attritor, high speed disperser, homo mixer, homogenizer, colloid mill, microfluidizer, sonolator, and cavitron may be employed. Among these, the tbead mill or roll mill are preferred. The bead mill and roll mill allow the catalyst and the activated carbon to be finely dispersed with low energy.

The dispersed mixtures of the catalyst, the activated carbon, the water, and the polyacrylate-based dispersant are then mixed with a pH adjuster or a neutralizer in a neutralization step.

The pH adjuster is required to neutralize the mixture obtained in the dispersion step and adjust the pH to, for example, 7-12. As the pH adjuster, for example, a low-boiling-point amine including triethylamine (TEA), ammonia, and dimethylaminoethanol are employed. The pH of the mixtures is adjusted to in a range of pH7 to pH12, preferably, in a range of pH8 to pH11.5, more preferably, in a range of pH9.5 to pH11 with the pH adjusters in the neutralization step. This prevents decrease of the paint viscosity and settling of the paint contents. Thus, the paint contents are uniformly and stably dispersed. The paint film from the paint composition in which the paint contents are uniformly and stably dispersed has less variation in performance.

The mixture obtained in the neutralization step are then mixed with a water-soluble resin in a paint prepare final step. If necessary, a pigment or an additive is added to them. The mixtures are stirred with, for example, a disperser.

The water-soluble resin, which is primary content of the paint, may be also called a water-dispersible resin. As the water-soluble resin, for example, an epoxy resin, epoxy ester resin, polyester resin, acrylic resin including methacrylate resin, acrylic silicone resin, polyurethane resin, alkyd resin, urethane resin, vinyl resin, urea formaldehyde resin, styrene butadiene rubber (SBR), and nitrile butadiene rubber (NBR) may be employed. These may be used individually or two or more may be used in combination. The water-soluble resin is provided in an aqueous solution, a emulsion, or a dispersion form.

The term "emulsion" inherently means liquids including colloidal particles or larger particles than colloidal particles are dispersed in liquids. This is referred to clause 152 of Iwanami Physics and Chemistry Dictionary, the fifth edition edit by Saburo Nagakura, published by Iwanami Shoten Publishing Ltd., at 20 Feb. 1998. However, herein, the term "emulsion" has broad meaning; that is, it means both liquids are dispersed in liquids and solids are suspended in liquids.

A preferred water-soluble resin is an acrylic resin or a polypropylene resin for providing advantageous dispersion, weather resistance, cost, adhesion, dispersion stability, and affinity to the catalyst and the activated carbon. The acrylic resin has high adhesion to metal. The polypropylene resin has high adhesion to both metal and resin.

The acrylic resin is also known as methacrylic resin. The acrylic resin, which is derived from acrylic acid or methacrylic acid, may be (meth)acrylate ester homopolymer, (meth)acrylate ester copolymer. Examples of (meth)acrylate ester includes the methyl (meth)acrylate, ethyl (meth)acrylate, propyl (meth)acrylate, isopropyl (meth)acrylate, n-butyl (meth)acrylate, isobutyl (meth)acrylate, pentyl (meth)acrylate, hexyl (meth)acrylate, ethyl hexyl (meth)acrylate, 2-hydroxyetyl (meth)acrylate, hydroxypropyl (meth)acrylate, 3-hydroxybutyl (meth)acrylate, 2,2-bis(hydroxymethyl)ethyl (meth)acrylate, 3-chloro-2-hydroxypropyl (meth)acrylate, glycidyl (meth)acrylate, aminoethyl (meth)acrylate, aminopropyl (meth)acrylate, (dimethylamino)ethyl (meth)acrylate, (diethylamino)ethyl (meth)acrylate, methoxyethyl (meth)acrylate, methoxypropyl (meth)acrylate, methoxybuthyl (meth)acrylate, and stearyl (meth)acrylate.

A monomer that can be copolymerized with the (meth)acrylic acid preferably has an ethylenically unsaturated group. Examples of the monomer include ethylene, propylene, butylene, butadiene, styrene, α-methylstyrene, vinylphenol, vinyl chloride, vinylidene chloride, vinyl acetate, vinyl pivalate, vinyl benzoate, vinyl alcohol, allyl alcohol, crotonic acid, itaconic acid, maleic acid, fumaric acid, (meth) acrylamide, N-methylolacrylamide, N-(butoxymethyl) (meth) acrylamide, and (meth) acrylonitrile.

Copolymerization is common in emulsion polymerization. However, it is not limited. Acid may include alkali metal salts or alkali earth metal salts. Alternatively, urethane modified (meth) aclylic resin, epoxy modified (meth) aclylic resin, phenol modified (meth) aclylic resin, or melamine modified (meth) aclylic resin may be used.

The acrylic resin emulsion, dispersion, or aqueous solution that includes a 1 to 99 wt % water-soluble acrylic resin is preferably alkalescent; that is, it preferably has hydrogen-ion exponent in a range of pH7 to pH9. Such a water-soluble acrylic resin is well dispersed in a solvent such as water, and provides the paint film having advantageous film-forming and evenness, and high density and adhesion to a metal target substrate.

The acrylic resin preferably has a median diameter in a range of 50 to 150 nm. The median diameter may be comparable to an average particle size. Such an acrylic resin is well dispersed in a solvent such as water and provides the paint film having advantageous film-forming and evenness, and high density and adhesion to a metal target substrate. More preferably, the acrylic resin has a median diameter in a range of 60 to 140 nm, most preferably, 70 to 130 nm.

The polypropylene resin may be a homopolymer consisting of propylene monomers, a random polymer that is a copolymer propylene including the propylene and the ethylene with a small amount, or a block polymer that is a homo-random copolymer including the propylene and the ethylene propylene rubber (EPR). The polypropylene resin may be a modified polypropylene resin or a chlorinated polypropylene resin.

The polypropylene resin emulsion, dispersion, or aqueous solution that includes a 1 to 99% polypropylene resin is preferably alkalescent; that is, it preferably has hydrogen-ion exponent in a range of pH7 to pH9. Such a polypropylene resin is well dispersed in a solvent such as water and provides the paint film having advantageous film-forming and evenness, and high density and adhesion to both metal target substrates and resin target substrates.

The polypropylene resin preferably has a median diameter in a range of 50 to 150 nm. The median diameter may be comparable to an average particle size. Such a polypropylene resin is well dispersed in a solvent such as water and provides the paint film having advantageous film-forming and evenness, and high density and adhesion to both metal target substrates and resin target substrates. More preferably, the polypropylene resin has a median diameter in a range of 60 to 140 nm, most preferably, 70 to 130 nm.

The water-soluble resin content is determined by referring to the characteristics of target substrates or the use application of the paint film. Too small an amount of the water-soluble resin may fail to provide the paint film having intended adhesion to target substrates. Such a paint film may peel easily or the catalyst and the activated carbon may easily drop from the paint film. Too large an amount of the water-soluble resin may fail to provide intended performance to decompose ozone. Thus, the water-soluble resin is present, for example, in a range of 5 to 100 parts by mass, preferably, 10 to 50 parts by mass to per hundred parts by mass of total solid contents of the catalyst and the activated carbon. Such a water-soluble resin content provides the paint film having both high adhesion to target substrates and high performance to decompose ozone.

In some embodiments, the water-based paint component may include a pigment or an additive to have higher performance in accordance with paint use application or paint purpose, for example, for rust prevention or for chipping resistance. Examples of the pigment include a color pigment, an extender pigment, a rust preventive pigment, or a functional pigment.

As the color pigment, for example, carbon black, titanium oxide, iron oxidize, zinc oxide, azo-type organic pigment, insoluble azo-type pigment, condensed azo, diketo-pyrrolo-pyrrole, benzimidazolon, phthalocyanine, indigo pigment, perinone, perylene, dioxane, quinacridone, isoindolinone, metal complex, chrome yellow, zinc iron oxide, red iron oxide, and titanium dioxide are employed.

As the rust preventive pigment, for example, zinc phosphate, zinc phosphite, aluminium polyphosphate, aluminium tripolyphosphate, calcium molybdate, zinc orthophosphate, zinc polyphosphate, zinc molybdate, zinc phosphomolybdate, aluminium phosphomolybdate, zinc oxide, zinc silicate, aluminium phosphate, calcium phosphate, zinc cyanamide, calcium cyanamide, barium metaborate, and magnesium phosphate are employed.

The rust preventive pigment that does not include toxic heavy metals including the chromium is preferable from the viewpoint of environmental protection. The rust preventive pigment content is less than 30 mass %, preferably, less than 20 mass % in the paint film. Such a content provides the paint composition having good storage stability.

As the extender pigment, for example, the talc, calcium carbonate, barium sulfate, calcium sulfate, mica, kaolinite, silica, diatomite, alumina, baryta, and silicon dioxide are employed. In particular, the talc has layer structures with high density in the paint film. Such a talc can prevent contamination of corrosion factors.

As the additive, for example, a viscosity modifier, film-forming aid, dispersant for dispersing the pigment, defoamer, filler, plasticizer, anti-sagging agent, coalesce, thixotropic agent, leveling agent, pH adjuster, neutralizer, ultraviolet absorbent, ultraviolet stabilizer, anti-settling agent, tackifier, curing catalyst, desiccant, stabilizer, and surface additive are employed.

As the dispersant for dispersing a pigment, a polycarboxylic acid-based dispersant may be employed.

As the defoamer, a silicone-based or acrylic-based defoamer may be employed. The defoamer prevents and destroys fine foam bubbles in mixing process and enables the paint composition to have intended homogenization and viscosity or fluidity. Additionally, the paint composition with few foam bubbles is less likely to cause rust resulting from moisture contamination from bubbles and thus has high performance to prevent rust.

As the desiccant, for example, metal-based desiccants such as cobalt naphthenate and lead naphthenate may be employed. The desiccant facilitates dry in paint film-forming process and thus allows the paint film to have increased polymerization of the water-soluble resin and increased density.

As the stabilizer, for example, alkanolamine derivatives such as the diisopropanolamine, ethanolamine, diethanolamine, diethanolamine, triisopropanolamine, triethanolamine may be employed. The stabilizer enables adjustment of fluidity, viscosity, or dispersion of the paint contents and stabilization of the paint. The alkanolamine derivative may action as corrosion inhibitor for initial rust.

Thus, the water-based paint composition including the catalyst, the activated carbon, the polyacrylate-based dispersion, the water-soluble resin, the pH adjuster and the water as a solvent are prepared through the dispersion step, the neutralization step, and the paint prepare final step.

This water-based paint composition is applied to target substrates in known painting way, for example, air spray, shower, spray, roll coater, flow coater, die coater, brush, immersion, drawing or ironing, knife coater, bar coating, and electrostatic coating. The application amount and conditions are not limited. The target substrates are coated with the paint having a predetermined thickness.

The water-based paint composition applied to target substrates is air-dried to evaporate or vaporize the solvent including water therein. Alternatively, it may be heat-dried at a predetermined temperature for a predetermined time or be force-dried using a dryer. Thus, the paint composition is dry-hardened. This drying yields a hardened paint film on the target substrates. This hardened paint film from the water-based paint composition of the present embodiment includes the catalyst and the activated carbon. Such a paint film has performance to decompose ozone.

In particular, the water-based paint composition of the present embodiment includes the polyacrylate-based dispersion that enables the catalyst and the activated carbon to be finely dispersed. This polyacrylate-based dispersion enables the catalyst and the activated carbon to have a maximum particle diameter ($D_{max}$) of, for example, 20 μm or less, and cumulative 90% particle size (D90) of, for example, 10 μm or less. The maximum particle diameter is determined by a line transect method with a grind gauge on the basis of JISK 5600 and JISK 5400. The cumulative 90% particle size (D90) or 90% diameter is determined by laser diffraction analysis with a laser diffraction particle size analyzer.

Consequently, the paint film from the water-based paint composition, in which the catalyst and the activated carbon is finely and well dispersed, is less likely to have paint seeding and roughness. Such a paint film is excellent in film-forming and adhesion to target substrates. Additionally, such a paint film has even surface and good appearance. Thus, with thin film, for example, a dry film thickness of just 5 μm or less, the paint film can cover the target surfaces fully. Additionally, the paint film, which derives from the water-based paint composition that is applied to target surfaces and then is dried, can be more strongly bonded to the target surfaces in comparison to the prior art in which a predetermined catalyst are stuck to a target substrate such as a radiator using binders. In the prior art, the surface of a substrate such as a radiator has binders to carry the predetermined catalyst. Thus, the surface of the substrate often catches foreign matters such as dirt or dust. This causes reduction in the ozone decomposition performance of the predetermined catalyst and activated carbon. The paint film from the water-based paint composition of the present embodiment is less likely to catch foreign matters such as dirt or dust and can prevent corrosion of a target substrate. Thus, the catalyst and the activated carbon is prevented from degrading and less peelable from a target substrate after long use. Consequently, the catalyst and the activated carbon keep high performance to decompose ozone for a longer time.

With the water-based paint composition according to the present embodiment, the polyacrylate-based dispersion enables the particulate catalyst and the particulate activated carbon to be well dispersed. This yields the fine particulate catalyst and the fine particulate activated carbon. Such a catalyst and an activated carbon adsorb a large amount of ozone. In particular, a small amount of the polyacrylate-based dispersion achieves well dispersion of the catalyst and the activated carbon. Thus, the polyacrylate-based dispersion is unlikely to inhibit ozone binding to the catalyst and the activated carbon. Adsorption of a large amount of ozone is achieved with use of a small amount of the catalyst and the activated carbon. Consequently, the water-based paint composition of the present embodiment has high performance to decompose ozone. Further, since the catalyst and the particulate are well and finely dispersed using the polyacrylate-based dispersion, the paint film is less likely to have paint seeding. Such a paint film is excellent in thin film-forming. Thus, the paint film from the water-based paint composition of the present embodiment exhibits excellent performance to decompose ozone even with a thin film.

Furthermore, the water-based paint composition including the polyacrylate-based dispersion allows the catalyst and the activated carbon to be stably dispersed. The water-based paint composition is free from precipitate and separation resulting from agglomeration or flocculation, for example, for 1 month. The water-based paint composition has high storage stability.

When the water-based paint composition is applied to structures exposed to air-flow, such as car drive components such as a fan blade, a radiator, and a intercooler, and car exterior components such as an under cover and a grille, a component coated with the paint film from the water-based paint composition reduces ozone around the component effectively. The ozone is decomposed on contact with the paint film. Thus, the ozone in air is removed. Thus, the water-based paint composition is applied to car components, on which air flows when the car travels. The surfaces of the car components are coated with the paint film from the water-based paint composition. This paint film formed on the surfaces has performance to decompose ozone. In particular, the prepared water-based paint composition of the present embodiment includes the catalyst and the activated carbon that are finely dispersed. This water-based paint composition can be applied to car components and can be used over wide area of a car. Thus, the car can be expected to have high performance to decompose ozone as a whole.

The examples of the water-based paint composition according to the present embodiment will be then described in detail.

The formulations of the examples of the water-based paint composition according to the present embodiment is shown in TABLE 1.

TABLE 1

| Formulations (in grams) | | Example 1 | Example 2 | Example 3 | Comparative Example 1 | Comparative Example 2 |
|---|---|---|---|---|---|---|
| Dispersion step | Activated carbon (Solid content) | 3.6 | 3.6 | 3.6 | 3.6 | 3.6 |
| | Manganese oxide-based catalyst | 8 | 8 | 8 | 8 | 8 |
| | Dispersant | Polyacrylate-based | Polyacrylate-based | Polyacrylate-based | 0 | Polycarboxylic acid ammonium salt |
| | | 0.5 | 0.5 | 1 | 0 | 1 |
| | Water | 68.4 | 72.4 | 71.9 | 71.9 | 71.9 |
| Neutralization step | Triethylamine (TEA) | 1.5 | 1.5 | 1.5 | 1.5 | 1.5 |
| Paint prepare final step | Acrylic resin | 0 | 8 | 8 | 8 | 8 |
| | Polypropylene resin | 12 | 0 | 0 | 0 | 0 |
| | Additive | 6 | 6 | 6 | 6 | 6 |
| | Total | 100 | 100 | 100 | 100 | 100 |
| | Storage stability | Good | Good | Good | NA | NA |
| | Ozone decomposition | Good | Good | Good | NA | NA |
| | Total evaluation | Good | Good | Good | Poor | Poor |

| Formulations (in grams) | | Comparative Example 3 | Comparative Example 4 | Comparative Example 5 | Comparative Example 6 |
|---|---|---|---|---|---|
| Dispersion step | Activated carbon (Solid content) | 3.6 | 3.6 | 3.6 | 3.6 |
| | Manganese oxide-based catalyst | 8 | 8 | 8 | 8 |
| | Dispersant | Polycarboxylic acid sodium salt | Phosphate ester | Polyurethane | Polycarboxylic acid sodium salt |
| | | 1 | 1 | 1 | 3 |
| | Water | 71.9 | 71.9 | 71.9 | 69.9 |
| Neutralization step | Triethylamine (TEA) | 1.5 | 1.5 | 1.5 | 1.5 |
| Paint prepare final step | Acrylic resin | 8 | 8 | 8 | 8 |
| | Polypropylene resin | 0 | 0 | 0 | 0 |
| | Additive | 6 | 6 | 6 | 6 |
| | Total | 100 | 100 | 100 | 100 |
| | Storage stability | Poor | Poor | Poor | Good |
| | Ozone decomposition | Fair | Fair | Fair | Poor |
| | Total evaluation | Poor | Poor | Poor | Poor |

As shown in TABLE 1, the water-based painting composition according to Example 1 included an activated carbon, which is derived from coconut shell and has an average particle size of 5 μm and BET specific surface area of 2000 m²/g, a manganese oxide-based catalyst, which contains the manganese oxide of 70 wt % or more, and has an average particle size of 5 μm and BET specific surface area of 250 m²/g, a polyacrylate-based dispersant, water as a solvent, the triethylamine (TEA) as a pH adjuster or neutralizer, a polypropylene resin as a water-soluble resin, and an additive such as a viscosity modifier or a thickener. In Example 2 and Example 3, the formulations were as in Example 1 except that the polypropylene resin were replaced by an acrylic resin.

The activated carbon content shown in TABLE 1 is the solid activated carbon content. In TABLE 1, the water content in dispersion step includes a deionized water content as a solvent content and a water content that is included in the activated carbon product as a solvent content.

To prepare the water-based painting composition according to Examples 1 to 3, a dispersion step was firstly carried out. In the dispersion step, the activated carbon, the manganese oxide-based catalyst (hereinafter, referred to as "catalyst"), the water as a solvent, and the polyacrylate-based dispersant were prepared and mixed according to the formulations shown in TABLE 1. The mixture is dispersed in a bead mill for 90 minutes at 1500 rpm. This bead mill was a zirconia bead mill using the zircon having 1.5 mm in diameter as media. In Examples 1 to 3, this dispersion process yielded the activated carbon having a maximum particle diameter ($D_{max}$) of 20 μm or less and cumulative 90% particle size (D90) of 10 μm or less, and the catalyst having a maximum particle diameter ($D_{max}$) of 20 μm or less and cumulative 90% particle size (D90) of 10 μm or less. The maximum particle diameter was determined by a line transect method with a grind gauge on the basis of JISK 5600 and JISK 5400 (1990). The cumulative 90% particle size (D90) was determined by laser diffraction analysis with a laser diffraction particle size analyzer.

A neutralization step was then carried out. In the neutralization step, the dispersed mixture was neutralized by adding the triethylamine (TEA) as a pH adjuster to the dispersed mixture. This triethylamine (TEA) was prepared according to the formulations shown in TABLE 1.

Subsequently, a paint prepare final step was carried out. In the paint prepare final step, the neutralized mixture was mixed with the polypropylene resin having a solid content of 30 wt % as the water-soluble resin or the acrylic resin having a solid content of 40 wt % as the water-soluble resin, and the additive such as a viscosity modifier or thickener. The resultant mixture was thoroughly stirred using a disperser for 5 to 10 minutes.

In this way, the water-based painting composition according to Examples 1 to 3 were prepared.

For comparison, some compositions of Comparative Examples 1 to 6 were prepared according to the formulations shown in TABLE 1. Comparative Examples 1 to 6 used some dispersants different from the polyacrylate-based dispersant used in Examples 1 to 3 or did not use any dispersants.

Comparative Example 1 did not use any dispersants.

Comparative Example 2 used polycarboxylic acid ammonium salt (anion) as the dispersant, instead of the polyacrylate-based dispersant used in Examples 1 to 3.

Comparative Examples 3 and 6 used polycarboxylic acid sodium salt (anion) as the dispersant, instead of the polyacrylate-based dispersant used in Examples 1 to 3.

Comparative Example 4 used phosphate ester as the dispersant, instead of the polyacrylate-based dispersant used in Examples 1 to 3.

Comparative Example 5 used polyurethane as the dispersant, instead of the polyacrylate-based dispersant used in Examples 1 to 3. Comparative Examples 1 to 6 were prepared as in Examples 1 to 3.

Examples 1 to 3 and Comparative Examples 1 to 6, which were prepared according to the formulations shown in TABLE 1, were tested and assessed to storage stability and performance to decompose ozone.

In the test for storage stability, each prepared composition was preserved for a month at 20° C. and whether each composition has agglomeration or flocculation, or not was determined. The example that did not have agglomeration or flocculation even after preservation for 1 month is determined to have good storage stability. The example that had agglomeration or flocculation is determined to have poor storage stability.

The test for ozone decomposition was conducted using an ozone decomposition testing device 100 shown in FIG. 1. The testing device 100 includes a pipe 10 in which a test specimen t was horizontally placed. This test specimen t was prepared by applying the paint composition to a polypropylene TP substrate 20 with 5 cm×7 cm in dimensions and drying them at 100° C. for 10 minutes. The polypropylene TP substrate 20 is termed "PP substrate 20" below. Thus, the test specimen t included the PP substrate 20 that is covered with a hardened paint film 1 with 5 cm×7 cm in dimensions. This paint film covered over the surface of the PP substrate 20.

Air including ozone was fed to the pipe 10 containing the test specimen t so that the air flows through the pipe 10 at a speed of 10 meters per second. It is note that the initial ozone concentration on the basis of the volume is 4.0 ppm at 25° C. While the air including ozone flows through the pipe 10, the ozone concentration was measured using an ozone sensors 31 and 32. The concentration of the ozone before being passed through the test specimen t, which consists of the PP substrate 20 covered with the paint film 1, was measured using the ozone sensor 31 while the concentration of the ozone after passing through the test specimen t was measured using the ozone sensor 32. Here, the distance x between the paint film 1 and the ozone sensor 32 was 2 mm. The ozone concentration was measured at room temperature 25° C. or near. Ozone decomposition rate (%) of the paint film 1 was calculated using ozone concentration b1 measured by using the ozone sensor 31 and ozone concentration b2 measured by using the ozone sensor 32. Specifically, the ozone decomposition rate (%) is given by: (b1−b2)/b1×100. The example that provided ozone decomposition rate of 24% or more is determined to have good performance to decompose ozone. The example that provided ozone decomposition rate of 18% or more and less than 24% is determined to have fair performance to decompose ozone. The example that provided ozone decomposition rate of less than 18% is determined to have poor performance to decompose ozone.

The example that has good storage stability and good performance to decompose ozone is determined to be good in a total evaluation. Other examples are determined to be poor in the total evaluation. The test results are given in the lower column of TABLE 1.

With the water-based paint composition according to Examples 1 to 3, the polyacrylate-based dispersant allowed the activated carbon and the catalyst to be highly and stably dispersed. Thus, the water-based paint composition according to Examples 1 to 3 did not have agglomeration or flocculation after preservation for 1 month at 20° C. The water-based paint composition according to Examples 1 to 3 has good storage stability as shown in the lower column of TABLE 1.

With the water-based paint composition according to Examples 1 to 3, the particulate activated carbon and the particulate catalyst were finely dispersed. Thus, the paint film from the water-based paint composition according to Examples 1 to 3 had less paint seeding and roughness. The paint film having a dry film thickness of about 5 μm was sufficient to cover over the surface of a polypropylene substrate. Thus, the paint film from the water-based paint composition according to Examples 1 to 3 is excellent in film-forming and ozone decomposition.

By contrast, the paint composition according to Comparative Example 1, which did not use any dispersants, had agglomeration or flocculation and gelation, which resulted from poor dispersion of the activated carbon and the catalyst. Thus, the paint composition according to Comparative Example 1 did not have intended liquidity suitable for application.

The paint composition according to Comparative Example 2, which used the polycarboxylic acid ammonium salt as a dispersant, also had agglomeration or flocculation and gelation, which resulted from poor dispersion of the activated carbon and the catalyst. Thus, the paint composition according to Comparative Example 2 also did not have intended liquidity suitable for application.

The paint composition according to Comparative Example 3, which used the polycarboxylic acid sodium salt (anion) as a dispersant, the paint composition according to Comparative Example 4, which used the phosphate ester as a dispersant, and the paint composition according to Comparative Example 5, which used the polyurethane as a dispersant, had intended liquidity suitable for application. Unfortunately, Comparative Examples 3 to 5 had poor dispersion and dispersion stability of the activated carbon and the catalyst storage stability. Thus, Comparative Examples 3 to 5 had agglomeration or flocculation after preservation for 1 month at 20° C. Comparative Examples 3 to 5 has poor storage stability. Additionally, the activated carbon and the catalyst according to Comparative Examples 3 to 5 din not be finely dispersed, in contrast to Examples 1 to 3 using the polyacrylate-based dispersant. Thus, Comparative Examples 3 to 5 provided the paint film having a large amount of paint seeding and large roughness. The paint film, which was applied to the surface of the substrate and covered over it, was very thick. Thus, Comparative Examples 3 to 5 exhibited poor film-forming. Comparative Examples 3 to 5 also exhibited inferior ozone decomposition rate as compared with Examples 1 to 3 using the polyacrylate-based dispersant.

Comparative Example 6 exhibited improved storage stability because of a higher dispersant content. Whereas, Comparative Example 6 exhibited lower performance to decompose ozone. This may be because the high dispersant content causes the dispersant to inhibit ozone binding to the catalyst and the activated carbon. The lower dispersant content fails to provide intended storage stability. The higher dispersant content fails to provide intended performance to decompose ozone. This may be because the higher dispersant content causes the dispersant to inhibit ozone binding to the catalyst and the activated carbon. Unlike Examples 1 to 3, with the dispersants of Comparative Example 6, Comparative Example 6 cannot have both good storage stability and performance to decompose ozone.

In Examples 1 to 3 using the polyacrylate-based dispersant, the catalyst and the activated carbon is well and finely dispersed with the low polyacrylate-based dispersant content. Such a particulate catalyst and particulate activated carbon is less likely to agglomerate or flocculate. Thus, Examples 1 to 3 is excellent dispersion and dispersion stability, and good storage stability. In addition, the paint film had less paint seeding and roughness. Such a paint film has advantage film-coating and appearance. Thus, the paint film according to Examples 1 to 3 exhibited high performance to decompose ozone.

In Examples 1 to 3, the polyacrylate-based dispersant, even with low content, allowed the activated carbon and the catalyst to be finely dispersed. Such a finely dispersed activated carbon and catalyst adsorb a large amount of ozone and provides high performance to decompose ozone. Thus, Examples 1 to 3 are excellent in ozone decomposition. Additionally, Examples 1 to 3 are excellent in dispersion stability and storage stability, and has a long shelf life.

In Comparative Example 3 to 5, the activated carbon and the catalyst is poor in dispersion. The paint composition according to Comparative Example 3 to 5 has a large amount of agglomeration or flocculation. Thus, the paint film had a large amount of paint seeding and large roughness. This paint film had poor film-forming, adhesion to the substrate, and appearance.

In Examples 1 to 3, the polyacrylate-based dispersant allows the activated carbon and catalyst to be finely dispersed. Thus, the paint film was free of paint seeding and roughness. This paint film had good film-forming and appearance. Additionally, Examples 1 to 3 used the polypropylene resin or the acrylic resin as the water-soluble resin. Thus, Examples 1 to 3 exhibited high adhesion to metal substrates. Specifically, with the paint film according to Examples 1 to 3, the number of squares peeled off from a metal substrate was two or less in adhesion test described in detail below. In particular, the Examples 2 and 3, which used the polypropylene resin as the water-soluble resin, exhibited high adhesion to not only the metal substrate but also a resin substrate. In the adhesion test of Examples 2 and 3, the number of squares peeled off from the resin substrate was two or less. Thus, use of the polypropylene resin as the water-soluble resin achieves high adhesion to both the metal substrate and the resin substrate. The composition using the polypropylene resin as the water-soluble resin does not require a special device for improvement of adhesion. Thus, such a composition can be provided at low cost. Use of the acrylic resin as the water-soluble resin achieves high adhesion to the metal substrate. When the composition using the acrylic resin as the water-soluble resin is applied to resin substrate, it is preferable that the composition is applied to preprocessed resin substrate for allowing the paint film to be strongly bond to the substrate.

The inventors determined a preferred polyacrylate-based dispersant content in detail as shown in TABLE 2.

In TABLE 2, the prepared paint compositions were different in the polyacrylate-based dispersant content (in grams). These prepared paint compositions were the same content except for the polyacrylate-based dispersant as Example 2 shown in TABLE 1.

The paint compositions of TABLE 2 used the same materials as the paint compositions of TABLE 1. The paint compositions of TABLE 2 were prepared as described above, TABLE 1.

The paint compositions of TABLE 2, which were different in the polyacrylate-based dispersant content, were also tested and assessed in the same manner as described above, as in TABLE 1, for storage stability and ozone decomposition rate (referring to FIG. 1).

TABLE 2

| Polyacrylate-based dispersant content (gram) | 0.1 | 0.3 | 0.5 | 0.7 | 1.0 | 2.0 | 5.0 | 10.0 |
|---|---|---|---|---|---|---|---|---|
| Concentration of polyacrylate-based dispersant in water-based paint composition (mass %) | 0.1 | 0.3 | 0.5 | 0.7 | 1.0 | 2.0 | 4.8 | 9.1 |
| Polyacrylate-based dispersant content (parts by weight) per hundred parts by weight of total amount of activated carbon and manganese oxide-based catalyst | 0.9 | 2.6 | 4.3 | 6.0 | 8.6 | 17.2 | 43.1 | 86.2 |
| Storage stability | Poor | Good | Good | Good | Good | Good | Good | Good |
| Ozone decomposition rate (%) | 24.9 | 25.6 | 24.8 | 24.7 | 25.1 | 25.3 | 18.4 | 10.2 |

The paint composition that included 0.1 mass % polyacrylate-based dispersant, or 0.9 parts by mass of the polyacrylate-based dispersant per hundred parts by mass of the total solid content of the activated carbon and the catalyst had poor dispersion stability of the activated carbon and the catalyst as shown in TABLE 2. This composition had agglomeration or flocculation after preservation for 1 month at 20° C. The paint composition that included 9.1 mass % polyacrylate-based dispersant, or 86.2 parts by mass of the polyacrylate-based dispersant per hundred parts by mass of the total solid content of the activated carbon and the catalyst exhibited low ozone composition rate. This may be because the large dispersant content causes the dispersant to inhibit ozone binding to the catalyst and the activated carbon.

The paint composition that included 0.3 to 4.8 mass % polyacrylate-based dispersant, or 2.6 to 43.1 parts by mass of the polyacrylate-based dispersant per hundred parts by mass of the total solid content of the activated carbon and the catalyst had good dispersion and dispersion stability of the activated carbon and the catalyst. Additionally, this composition, in which the dispersant did not inhibit ozone binding, exhibited high ozone composition rate. Thus, this composition with optimal polyacrylate-based dispersant content exhibited both good dispersion stability and good performance to decompose ozone.

Further, the content of the polyacrylate-based dispersant not less than 1.5, more preferably, not less than 2, most preferably, not less than 2.5 by mass, per hundred parts by mass of the total solid content of the activated carbon and the catalyst, provides excellent storage stability. The content of the polyacrylate-based dispersant not more than 75, more preferably, not more than 60, most preferably, not more than 50 by mass, per hundred parts by mass of the total solid content of the activated carbon and the catalyst, provides the paint film having good film-forming and appearance, and high performance to decompose ozone.

Thus, it is preferable that the polyacrylate-based dispersant content is in a range of 1.5 to 75 by mass, per hundred parts by mass of the total solid content of the activated carbon and the catalyst. Such a content provides both excellent storage stability and high performance to decompose ozone. Additionally, this content provides good film-forming, adhesion and appearance of the paint film. It is more preferable that the polyacrylate-based dispersant content is in range of 2 to 60 by mass, most preferably, 2.5 to 50 by mass, per hundred parts by mass of the total solid content of the activated carbon and the catalyst.

It is preferable that the polyacrylate-based dispersant is present in the water-based paint composition at a concentration in a range of 0.3 to 5 mass %. This concentration provides both excellent storage stability and high performance to decompose ozone. Additionally, this concentration provides good film-forming, adhesion and appearance of the paint film. It is more preferable that the polyacrylate-based dispersant is present in the water-based paint composition at a concentration in a range of 0.3 to 2 mass %.

The inventors also determined a preferred activated carbon content and a preferred catalyst content in detail as shown in TABLE 3 and TABLE 4 below.

The paint compositions of TABLE 3, which were different in the ratio of the activated carbon to the catalyst, were prepared to determine the relation between the ratio of the activated carbon to the catalyst, and the properties of the paint compositions and the performance of the paint film from the paint compositions. The paint compositions of TABLE 3 used the same materials as the paint compositions of TABLE 1. The paint compositions of TABLE 3 were prepared as described above, TABLE 1. The prepared paint compositions of TABLE 3 were also tested for storage stability and ozone decomposition rate.

The storage stability test was conducted in the same manner as described above, as in TABLE 1. That is, the presence or absence of agglomeration or flocculation in the prepared paint compositions after preservation for 1 month at 20° C. was determined. The paint composition that had a small amount of agglomeration or flocculation after preservation for 1 month but had liquidity suitable for application or practical use through agitation is determined to have fair storage stability.

The ozone decomposition test was conducted as shown in FIG. 2. Specifically, a test specimen t was prepared by applying the paint composition to a polypropylene TP substrate 20 with 5 cm width×7 cm long and drying them at 100° C. for 10 minutes. This paint composition covered over the surface of the substrate 20. The test specimen t was placed in a 20 litre volume mylar bag 50. Air was put into the bag 50 by using an air blow device, and ozone generated by using an ozonizer was then put into the bag 50 such that the bag 50 contains 0.2 ppm ozone (on the volumetric basis). The bag 50 was then heat-sealed. After 30 minutes, ozone concentration in the bag 50 was measured by using an ozone sensor 33. Ozone decomposition rate is calculated in accordance with initial ozone concentration and after 30 minutes ozone concentration measured by using an ozone sensor 33. The ozone decomposition test was conducted at room temperature 25° C.

For comparison, Comparative Examples 7 and 8 were prepared. Comparative Examples 7 and 8 used only one of the activated carbon or the catalyst. Comparative Examples 7 and 8 were also tested for storage stability and ozone decomposition rate.

The formulations of the prepared paint compositions are given in upper columns of TABLE 3 and the test results are given in lower columns of TABLE 3.

The activated carbon content shown in TABLE 3 is the solid activated carbon content. In TABLE 3, the water content in dispersion step includes a deionized water content as a solvent content and a water content that is included in the activated carbon product as a solvent content.

Specifically, it is preferable that the ratio of the activated carbon (solid content) to the catalyst in the water-based paint composition is in a range of 20/80 to 80/20 to provide high performance to decompose ozone and practical storage stability as Examples 4 to 8 shown in TABLE 3. In particu-

TABLE 3

| Formulations (in grams) | | Example 4 | Example 5 | Example 6 | Example 7 | Example 8 | Comparative Example 7 | Comparative Example 8 |
|---|---|---|---|---|---|---|---|---|
| Activated carbon/manganese oxide-based catalyst (ratio) | | 20/80 | 30/70 | 50/50 | 70/30 | 80/20 | 0/100 | 100/0 |
| Dispersion step | Activated carbon (Solid content) | 2.3 | 3.5 | 5.8 | 8.1 | 9.3 | 0 | 11.6 |
| | Manganese oxide-based catalyst | 9.3 | 8.1 | 5.8 | 3.5 | 2.3 | 11.6 | 0 |
| | Polyacrylate-based dispersant | 0.5 | 0.5 | 0.5 | 0.5 | 0.5 | 0.5 | 0.5 |
| | Water | 68.4 | 68.4 | 68.4 | 68.4 | 68.4 | 68.4 | 68.4 |
| Neutralization step | Triethylamine (TEA) | 1.5 | 1.5 | 1.5 | 1.5 | 1.5 | 1.5 | 1.5 |
| Paint prepare final step | Polypropylene resin | 12 | 12 | 12 | 12 | 12 | 12 | 12 |
| | Additive | 6 | 6 | 6 | 6 | 6 | 6 | 6 |
| Total | | 100 | 100 | 100 | 100 | 100 | 100 | 100 |
| Storage stability | | Good | Good | Good | Good | Fair | Good | Poor |
| Ozone decomposition rate (%) | | 80.0 | 83.0 | 83.1 | 81.9 | 76.0 | 75.9 | 50.0 |

As shown in TABLE 3, Comparative Example 7, which used the catalyst but not used the activated carbon, exhibited an ozone decomposition rate of 75.9%, which is lower than that that of Examples 4 to 8. Comparative Example 8, which used the activated carbon but not used the catalyst, exhibited an ozone decomposition rate of 50.9%, which is much lower than that of Examples 4 to 8. Comparative Example 8 exhibited poor or bad storage stability. This is because that the particulate activated carbon having an adsorption property adsorbed a large amount of resin or organic matter in the paint composition and thus agglomerated or flocculated. It has been found that only use of the catalyst provides poor paint stability, specifically poor storage stability.

Examples 4 to 8 using both the activated carbon and the catalyst provided much higher ozone decomposition rate than Comparative Examples 7 and 8 using only one of the activated carbon or the catalyst. Examples 4 to 8 exhibited very high performance to decompose ozone.

Thus, both the catalyst and the activated carbon are required to decompose ozone efficiently. However, it is noted that the higher proportion of the activated carbon to the catalyst may adversely affect the stability, specifically storage stability of the paint composition. Further, the activated carbon is susceptible to oxidation and deterioration. Thus, the higher proportion of the activated carbon to the catalyst may fail to provide long life performance to decompose ozone. It is also note that the lower proportion of the activated carbon to the catalyst may fail to provide the intended performance to decompose ozone and intended synergistic effects of the activated carbon and the catalyst. This is because the lower the proportion of the activated carbon to the catalyst is, the smaller the effect of ozone decomposition of the activated carbon is. In particular, the catalyst is susceptible to moisture, chloride, sulfur oxides ($SO_x$), and nitrogen oxides ($NO_x$) in atmosphere. These matters may decrease ozone decomposition performance of the catalyst. Thus, it is preferable that a predetermined amount of the activated carbon is used to retain high performance to decompose ozone over long.

lar, it is more preferable that the ratio of the activated carbon to the catalyst in the water-based paint composition is in a range of 30/70 to 70/30 to provide higher performance to decompose ozone for long term and excellent storage stability for long term as Examples 5 to 7. It is noted that the ratio of the activated carbon to the catalyst in the water-based paint composition equates with the ratio of the activated carbon to the catalyst in the paint film from the water-based paint composition. When the ratio of the activated carbon to the catalyst in the water-based paint composition is in a range of 20/80 to 80/20, the ratio of the activated carbon to the catalyst in the paint film from the water-based paint composition is also in a range of 20/80 to 80/20.

Further, the paint compositions that are different in the total concentration of the activated carbon and the catalyst were prepared as shown in TABLE 4 to determine the relation between the paint film performance and the concentration of the activated carbon and the catalyst, which have performance to decompose ozone. The paint compositions and the paint films from the paint compositions of TABLE 4 have the same ratio (by weight) of the activated carbon (solid content) to the catalyst, 70/30, as in Example 7 of TABLE 3. The paint compositions and the paint films of TABLE 4 are different in the activated carbon content and the catalyst content. In the paint compositions and the paint films of TABLE 4, the activated carbon and the catalyst are present at a concentration in a range of 33 to 83% by mass. The formulation except for the activated carbon and the catalyst of the paint compositions of TABLE 4 were the same as that of Example 7. The paint compositions of TABLE 4 were prepared as described above, TABLE 3. In TABLE 4, the component content (in grams) except for the activated carbon content and the catalyst content were as in Example 7. TABLE 4 differs from Example 7 in the activated carbon content and the catalyst content.

The prepared paint compositions of TABLE 4 were tested for ozone decomposition rate and adhesion to a substrate.

The ozone decomposition test was conducted by using the device shown in FIG. 1 as in TABLE 1 and TABLE 12 described above.

In the adhesion test, a test specimen was prepared by air-spraying the paint composition on a polypropylene substrate and by drying them at 100° C. for 10 minutes. Thus, the test specimen was formed of the polypropylene substrate coated with the paint film. This test specimen was tested with respect to adhesion in compliance with JIS-K-5600-5-6:1999 (cross-cut test). Specifically, the coated surface of the test specimen was cross-cut to make 11 slits at 1 mm intervals respectively by using a utility knife. This cross-cut formed 100 squares, each of which is 1 mmx1 mm. An adhesive tape (masking tape) was then put on the 100 squares followed by putting pressure on the tape. Subsequently, the tape on the 100 squares was peel off in one sitting, and the number of the peeled squares was counted. The paint film in which the number of the peeled squares was two or less is determined to have good adhesion. The paint film in which the number of the peeled squares was three or more is determined to have poor adhesion.

The total concentrations of the activated carbon and the catalyst in the prepared paint compositions are shown in upper columns of TABLE 4 while the test results are shown in lower columns of TABLE 4.

TABLE 4

| Total concentration of activated carbon and manganese oxide-based catalyst in paint-film contents (mass %) | 33% | 53% | 63% | 73% | 83% |
|---|---|---|---|---|---|
| Activated carbon/manganese oxide-based catalyst | | | 70/30 | | |
| Ozone decomposition rate (%) | 1.23 | 5.80 | 19.61 | 25.25 | 25.61 |
| Adhesion | Good | Good | Good | Good | Fair |

It was found that the higher concentration of the activated carbon and the catalyst equates with the higher ozone decomposition rate as shown in TABLE 4. In particular, the paint film that includes the activated carbon and the catalyst at concentration of 63% or more exhibited higher ozone decomposition rate. It is noted that the paint films that include the activated carbon and the catalyst at concentration of 73% or more exhibited the small increase rate of the ozone decomposition rate. This may be because dispersion of a predetermined amount of the dispersant may be limited.

Too high a concentration of the activated carbon and the catalyst may adversely affect adhesion. Low adhesion to the substrate may cause the peeling of the paint film or the falling of the paint film contents. Thus, the long life performance to decompose ozone may not be obtained.

It has been found that the paint film including the activated carbon and the catalyst that are present at a concentration of 60% or more, preferably, 70% or more provides high performance to decompose ozone when the ratio of the activated carbon (solid content) to the catalyst in the paint composition and the paint film is in the range of 20/80 to 80/20. Additionally, it has been found that the paint film including the activated carbon and the catalyst that are present at a concentration of 90% or less, preferably, 85% or less provides high adhesion to the substrate. The activated carbon and the catalyst are preferably present in the paint film at a concentration in a range of 60% to 90%, more preferably, 70% to 80%. Such a content provides high adhesion to the substrate and high performance to decompose ozone for a long term.

The total concentration (in wt %) of the activated carbon and the catalyst in the paint film from the paint composition is calculated by dividing the total solid amount of the activated carbon and the catalyst by the total solid paint content in the paint composition, and multiplying the resultant by 100.

As described above, the water-based paint composition according to the embodiment includes a water-based solvent, a manganese dioxide-based catalyst as a manganese dioxide-based catalyst, an activated carbon, a polyacrylate-based dispersant, an acrylic resin or a polypropylene resin as a water-soluble resin, the triethylamine as a pH adjuster. The water-based paint composition is applied to substrates and then dried. This yields a hardened paint film.

The process for preparing the water-based paint composition according to the embodiment includes a dispersion step of mixing and dispersing water as a principal component of a solvent, a manganese dioxide-based catalyst as a manganese dioxide-based catalyst, an activated carbon, a polyacrylate-based dispersant, a neutralization step of mixing triethylamine as a pH adjuster with the resultant mixture, and a paint prepare final step of mixing and dispersing an acrylic resin or a polypropylene resin as a water-soluble resin with the resultant mixture.

With the water-based paint composition according to the embodiment of the present invention and the process for preparing the water-based paint composition according to the embodiment of the present invention, the polyacrylate-based dispersant provides good and stable dispersion of the manganese dioxide-based catalyst and the activated carbon. This provides the hardened paint film with paint seeding free. Such a paint film has good film-forming and good adhesion. The fine dispersed manganese dioxide-based catalyst and the fine dispersed activated carbon in the paint film adsorb a large amount of ozone. Thus, the paint film has high performance to decompose ozone. In particular, the manganese dioxide-based catalyst, which has higher catalytic activity for ozone decomposition among manganese oxide-based catalysts, provide higher performance to decompose ozone. Further, the combination use of the manganese dioxide-based catalyst and the activated carbon provides higher performance to decompose ozone than if only one or the other is used. Additionally, the paint composition using the activated carbon, which is available at low cost, is less expensive. Furthermore, the paint composition including the polyacrylate-based dispersant, which allows the manganese dioxide-based catalyst and the activated carbon to be highly dispersed, has good storage stability for practical use.

The manganese dioxide-based catalyst preferably has a median diameter in a range of 1 to 20 μm and a specific surface area in a range of 100 to 400 $m^2/g$ determined by the BET method. The median diameter may be comparable to an average particle size. Such a manganese dioxide-based catalyst exhibits stable dispersion. This provides the paint composition having higher dispersion and dispersion stability and the paint film having higher performance to decompose ozone.

The activated carbon preferably has a median diameter in a range of 1 to 20 μm and a specific surface area in a range of 500 to 3000 $m^2/g$ determined by the BET method. The median diameter may be comparable to an average particle size. Such an activated carbon exhibits stable dispersion. This provides the composition having higher dispersion and dispersion stability and the paint film having higher performance to decompose ozone.

The polyacrylate-based dispersant preferably has a weight average molecular in a range of 5000 to 30000, an acid value in a range of 1 to 50, and a hydrogen-ion exponent in a range of pH4 to pH9. Such a polyacrylate-based dispersant, even with a small amount, achieves higher dispersion and dispersion stability of the paint contents, as well as high performance to decompose ozone. The polyacrylate-based dispersant is preferably present at 1.5 to 75 parts by mass, per hundred parts by weight of the total solid amount of the manganese oxide-based catalyst and the activated carbon. Such a content provides the water-based paint composition having both high storage stability and high performance to decompose ozone. The polyacrylate-based dispersant is preferably present in the water-based paint composition at a concentration in a range of 0.3 to 5 mass %. Such a concentration provides the water-based paint composition having both high storage stability and high performance to decompose ozone.

In the water-based paint composition of above embodiments, the manganese oxide-based catalyst and the activated carbon have a maximum particle diameter ($D_{max}$) of 20 μm or less. The maximum particle diameter is determined by a line transect method with a grind gauge according to JIS K 5600 and JIS K 5400 (1990). The manganese oxide-based catalyst and the activated carbon are dispersed using a bead mill or a roll mill, and have a maximum particle diameter of 20 μm or less through a dispersion step.

This provides paint film with agglomeration or flocculation free, higher forming-film and adhesion. Additionally, such a manganese oxide-based catalyst and an activated carbon adsorb a larger amount of ozone, thus providing higher performance to decompose ozone. Further, such a manganese oxide-based catalyst and an activated carbon provides the water-based paint composition having excellent dispersion stability and storage stability.

Thus, the water-based paint composition has long shelf life and the paint film from the water-based paint composition has stable paint performance.

In the water-based paint composition of above embodiments, the manganese oxide-based catalyst and the activated carbon have a 90% diameter (D90) of 10 μm or less. The 90% diameter (cumulative %) is based on a volume distribution and is determined by laser diffraction analysis. The manganese oxide-based catalyst and the activated carbon are dispersed using a bead mill or a roll mill, and have 90% diameters (D90) of 10 μm or less through a dispersion step.

The water-based paint composition including the manganese oxide-based catalyst and the activated carbon that have a 90% diameters ($D_{90}$) of 10 μm or less has a small amount of coarser grains such as agglomeration and flocculation. Thus, this water-based paint composition provides the paint film having less paint seeding and evenness. Such a paint film is excellent in forming-film and adhesion. Additionally, the paint film having less agglomeration and flocculation adsorbs a large amount of ozone and have high performance to decompose ozone. Further, this water-based paint composition is excellent in dispersion stability and storage stability.

Thus, the water-based paint composition has higher storage stability and the paint film from the paint composition is excellent in visual appearance and high performance to decompose ozone.

In the water-based paint composition of above embodiments, the water-based resin is an acrylic resin or a polypropylene resin. The acrylic resin and the polypropylene resin are compatible with the manganese oxide-based catalyst and the activated carbon. Thus, the manganese oxide-based catalyst and the activated carbon is more uniformly dispersed in the resin. In particular, the acrylic resin has a wide variety of a molecular weight. Thus, the use of the acrylic resin may easily yield the paint film having desired performance. Additionally, the acrylic resin provides the paint film having high weather resistance, water resistance, and chemical resistance. The polypropylene resin provides the paint film having good adhesion to resin substrates in addition to metal substrates. Such a paint film has long-term high performance to decompose ozone.

The solid weight ratio of the manganese oxide-based catalyst to the activated carbon is preferably in a range of 20/80 to 80/20, more preferably, 30/70 to 70/30 in the water-based paint composition. Such a ratio allows the manganese oxide-based catalyst and the activated carbon to act synergistically, thus providing higher performance to decompose ozone, as well as good storage stability.

The manganese oxide-based catalyst and the activated carbon is preferably is present in the paint film from the water-based paint composition at total concentration in a range of 60 to 90%, more preferably, 65 to 85%, most preferably, 70 to 80% by mass. This provides higher performance to decompose ozone, as well as high adhesion to substrates.

In some embodiments, the activated carbon may carry organometallic complexes, for example, including cobalt or iron. The manganese oxide-based catalyst may include calcium oxide adsorbing moisture.

The water-based paint composition according to the present embodiment can be used in car bodies. Further, the water-based paint composition may be used in trains, ships, airplanes, or buildings. Furthermore, the water-based paint composition may be used in office automation equipment or electrical equipment including dry copiers, ozonizers, ultraviolet ray lamps, and air purifiers for dedorization, sterization, and breach. For example, the water-based paint composition may be used in the housing of purifying devices, the casing, exhaust filter, exhaust duct, or exhaust fan of ozone generators with high voltage or corona discharge for decomposing residual ozone.

The present invention is not limited to above mentioned embodiment with respect to other formulations, contents, components, amounts, particle size of the water-based paint composition. In addition, not all of the numeric values described in the present embodiment indicate a critical value, and a certain numeric value indicates a preferred value for the embodiment. A little variation is acceptable.

The invention claimed is:

1. A process for preparing a water-based paint composition, comprising the successive steps of:
    (a) mixing a water-based solvent, a manganese oxide-based catalyst, an activated carbon, and a polyacrylate-based dispersant;
    (b) mixing a pH adjuster with the resultant mixture; and
    (c) mixing a water-soluble resin with the resultant mixture.

2. The process according to claim 1, wherein
    in step (a), the water-based solvent, the manganese oxide-based catalyst, the activated carbon, and the polyacrylate-based dispersant are dispersed using a bead mill or a roll mill, and
    the dispersed manganese oxide-based catalyst has a maximum particle diameter of 20 μm or less determined by grind gauge, and
    the dispersed activated carbon has a maximum particle diameter of 20 μm or less determined by the grind gauge.

3. The process according to claim 1, wherein
    in step (a), the water-based solvent, the manganese oxide-based catalyst, the activated carbon, and the polyacrylate-based dispersant are dispersed using a bead mill or a roll mill, and the dispersed manganese oxide-based catalyst has a 90% diameter (D90) of 10 μm or less determined by laser diffraction analysis, and the dispersed activated carbon has a 90% diameter (D90) of 10 μm or less determined by laser diffraction analysis.

* * * * *